United States Patent
Yano et al.

(10) Patent No.: US 10,409,529 B2
(45) Date of Patent: Sep. 10, 2019

(54) INFORMATION PROCESSING APPARATUS AND INFORMATION PROCESSING METHOD

(71) Applicant: CANON KABUSHIKI KAISHA, Tokyo (JP)

(72) Inventors: Takaaki Yano, Tokyo (JP); Kosuke Tsujita, Abiko (JP); Makoto Anno, Tokyo (JP); Yuuki Maeda, Nagareyama (JP); Hiroyuki Toriyabe, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/143,139

(22) Filed: Sep. 26, 2018

(65) Prior Publication Data

US 2019/0095147 A1    Mar. 28, 2019

(30) Foreign Application Priority Data

Sep. 28, 2017    (JP) .................................. 2017-189093

(51) Int. Cl.
  *G06F 3/12*    (2006.01)
  *G06K 15/02*   (2006.01)
  *H04N 1/60*    (2006.01)

(52) U.S. Cl.
  CPC .......... *G06F 3/1208* (2013.01); *G06F 3/1234* (2013.01); *G06K 15/027* (2013.01); *H04N 1/6044* (2013.01)

(58) Field of Classification Search
  USPC ........................................................ 358/1.14
  See application file for complete search history.

(56) References Cited

U.S. PATENT DOCUMENTS

| | | |
|---|---|---|
| 2005/0117926 A1 | 6/2005 | Tanaka et al. |
| 2011/0075192 A1 | 3/2011 | Kumamoto |
| 2013/0038884 A1 | 2/2013 | Anderson et al. |
| 2014/0036284 A1 | 2/2014 | Matsuzaki |
| 2016/0044209 A1* | 2/2016 | Tsukano ................ H04N 1/60 358/1.9 |

(Continued)

FOREIGN PATENT DOCUMENTS

| | | |
|---|---|---|
| JP | 2003008920 A | 1/2003 |
| JP | 2003216398 A | 7/2003 |

(Continued)

*Primary Examiner* — Neil R McLean
*Assistant Examiner* — Darryl V Dottin
(74) *Attorney, Agent, or Firm* — Canon U.S.A., Inc. IP Division

(57) ABSTRACT

An information processing apparatus, capable of being connected to an image processing apparatus including an image forming unit, includes an acquisition unit configured to acquire a judgment result as to whether a colorimetric value obtained as a result of measuring a color of a chart image formed by the image forming unit satisfies a predetermined criterion in terms of a difference between the colorimetric value and a target value, a notification unit configured to notify the image processing apparatus that the judgment result acquired by the acquisition unit does not satisfy the criterion, and an instruction unit configured to, before the notification unit issues the notification to the image processing apparatus, instruct the image processing apparatus to execute an adjustment process.

10 Claims, 25 Drawing Sheets

(56) References Cited

U.S. PATENT DOCUMENTS

2017/0078496 A1    3/2017  Sugimoto et al.
2017/0280022 A1*  9/2017  Kuroiwa .............. G06K 15/027

FOREIGN PATENT DOCUMENTS

| JP | 2005260819 A | 9/2005 |
| JP | 2006212918 A | 8/2006 |
| JP | 2010-201901 A | 9/2010 |
| JP | 2012166424 A | 9/2012 |
| JP | 2016025646 A | 2/2016 |

* cited by examiner

FIG. 20

COLOR MANAGEMENT: COLOR CHECK RESULT — UI1101

PRINTING APPARATUS  PRINTER_001    JUDGMENT RESULT: FAILED
COLOR CHECK PROFILE  #001          EXECUTION DATE AND TIME: April 3, 2017: 8:10

— UI1102

DETAILS OF JUDGEMENT RESULT — UI1103   UI1104

| JUDGEMENT ITEM | COLORIMETRIC VALUE | TARGET VALUE | JUDGEMENT RESULT |
|---|---|---|---|
| AVERAGE dE | 2.89 | 3.0 | OK |
| MAXIMUM dE | 5.23 | 5.0 | FAILED |
| PaperWhite | 0.56 | 1.0 | OK |
| Cyan100% | 1.81 | 2.5 | OK |

DETAILS OF PATCH MEASUREMENT RESULT — UI1105

FIG. 21

COLOR MANAGEMENT: COLOR CHECK RESULT — UI1201

PRINTING APPARATUS  PRINTER_001    JUDGMENT RESULT: FAILED
COLOR CHECK PROFILE  #001          EXECUTION DATE AND TIME: April 3, 2017: 8:10

— UI1202

DETAILS OF PATCH MEASUREMENT RESULT — UI1203   UI1204

| # | CMYK | COLORIMETRIC VALUE | | | REFERENCE VALUE | | | dE |
|---|---|---|---|---|---|---|---|---|
| | | L | a | b | L | a | b | |
| 001 | 0,0,0,0 | 89.61 | 1.18 | -0.98 | 90.00 | 1.05 | -1.30 | 0.56 |
| 002 | 10,0,0,0 | xx | xx | xx | xx | xx | xx | xx |
| 003 | 20,0,0,0 | xx | xx | xx | xx | xx | xx | xx |
| 004 | 30,0,0,0 | xx | xx | xx | xx | xx | xx | xx |

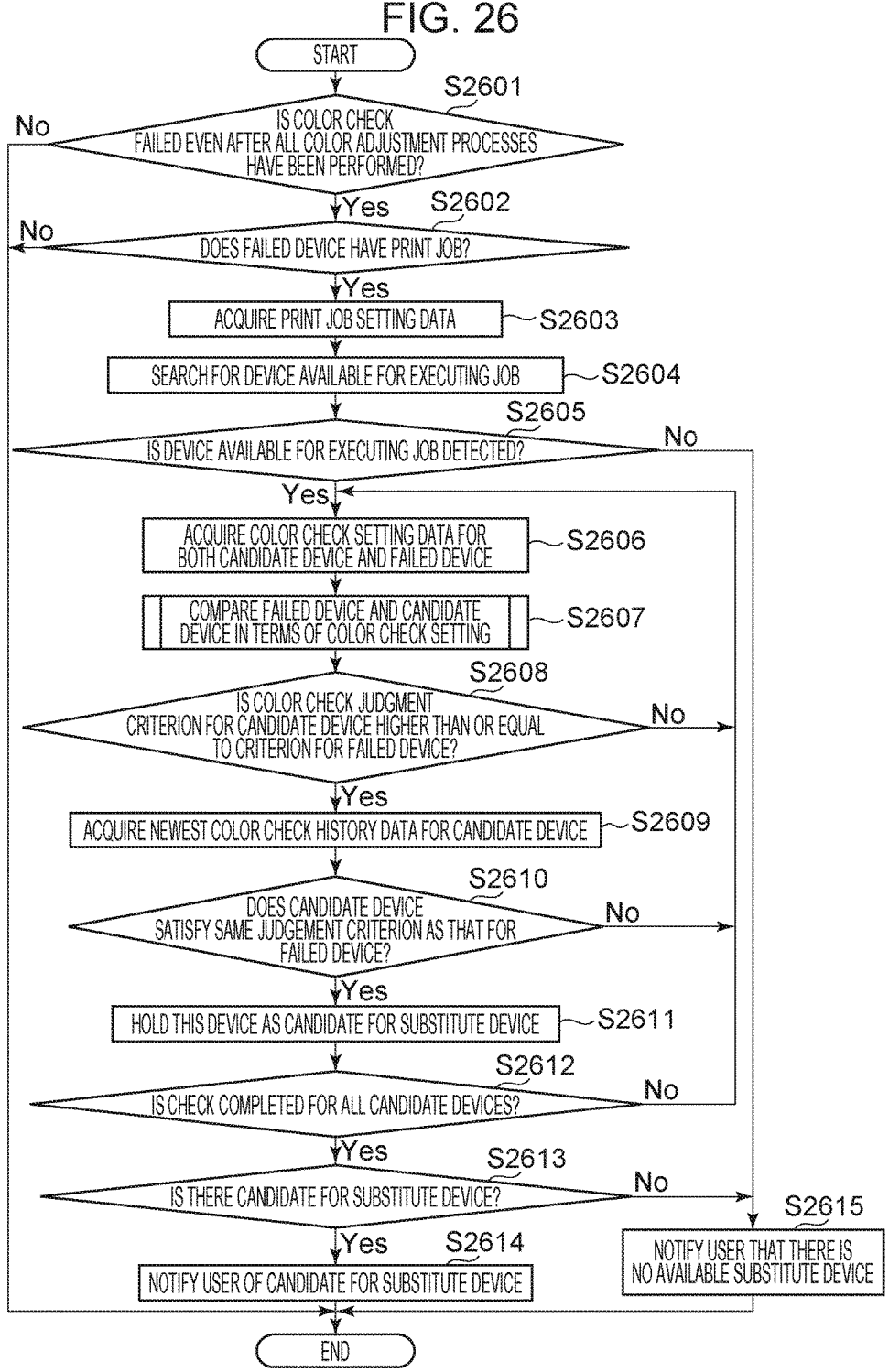

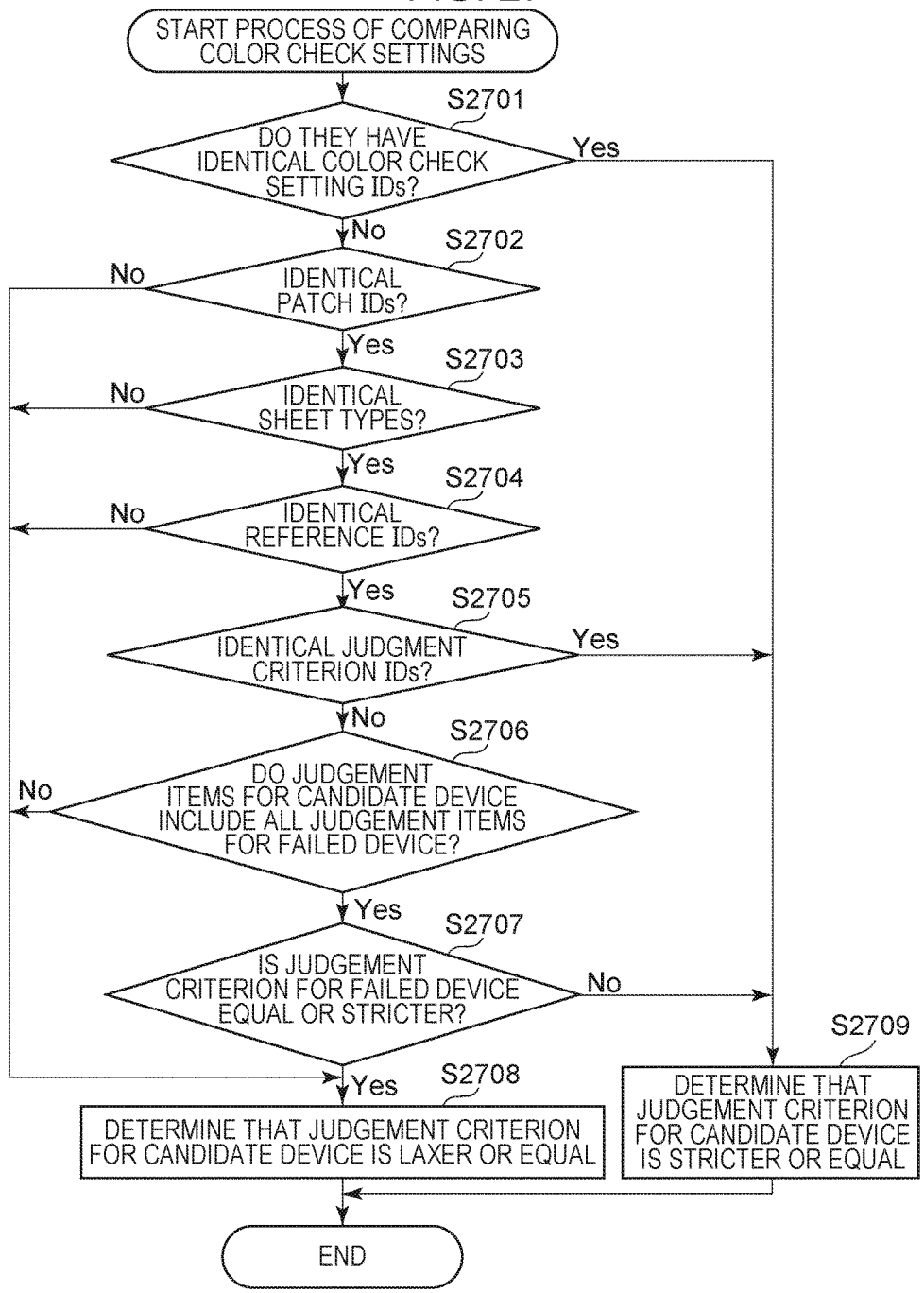

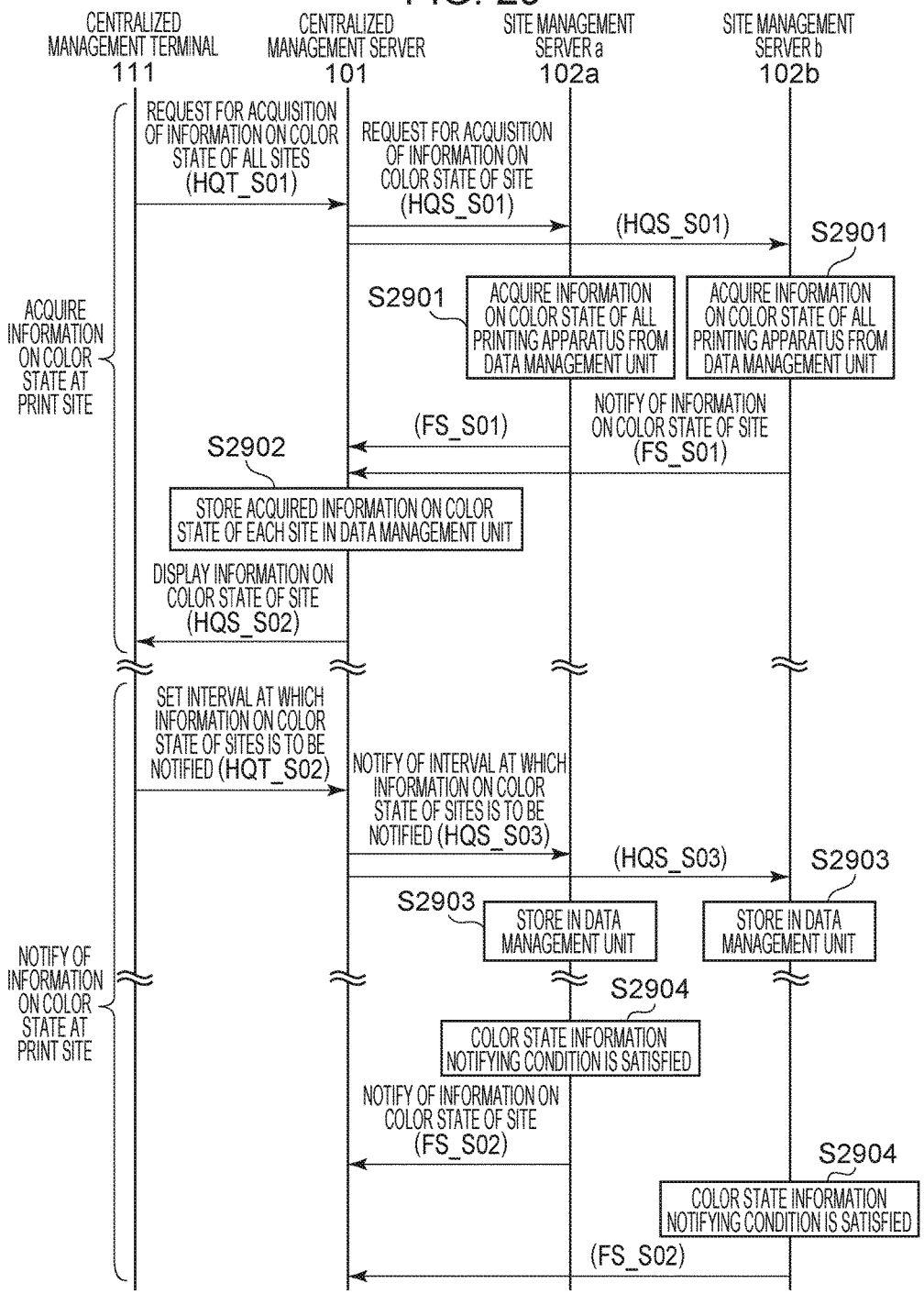

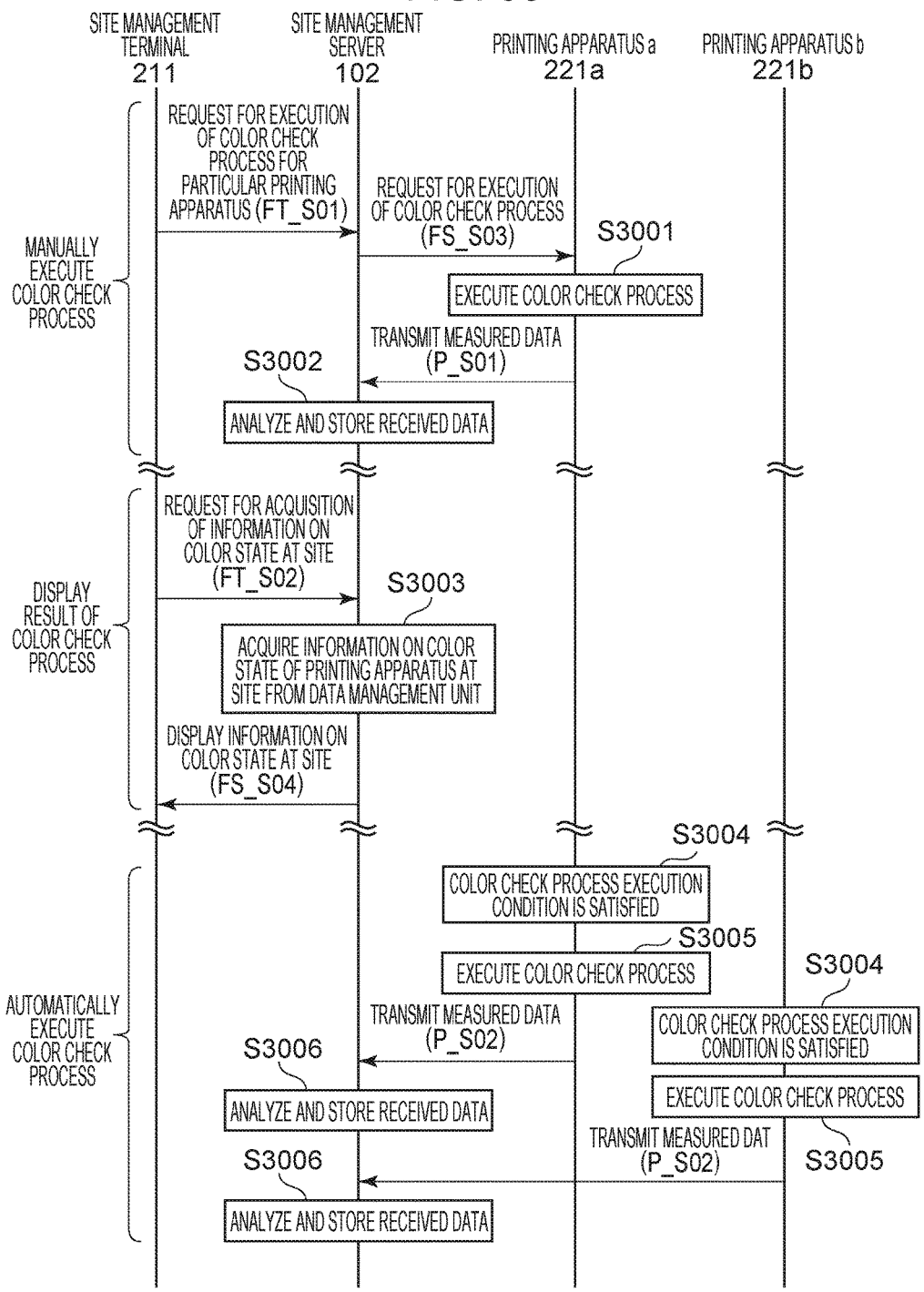

INFORMATION PROCESSING APPARATUS AND INFORMATION PROCESSING METHOD

BACKGROUND OF THE INVENTION

Field of the Invention

The present disclosure relates to a color management technique to manage a color of an image printed by an image processing apparatus.

Description of the Related Art

In recent years, it has become popular to use various kinds of printing apparatuses in commercial printing markets. Printed matters produced by these printing apparatuses are used as commodities by users, and thus it is necessary to satisfy a high-level demand in terms of quality or precision of color of images formed as the printed matters. However, the color of an image printed by a printing apparatus can vary due to various factors. For example, degradation of parts of a printing apparatus, an environment (temperature, moisture, etc.) in which the printing apparatus is installed, supplies or consumables such as toner, sheets, and the like used in printing by the printing apparatus, and/or the like can cause a change in color of images.

Therefore, in practical commercial printing sites, a person called a color expert works to constantly achieve desired high color quality in maintain a desired color in images printed by a printing apparatus. In general, the color expert performs a color management operation on images printed by the printing apparatus. The color management operation includes a plurality of processing steps. One of processing steps is a color check operation to check a color of an image printed by the printing apparatus subjected to color management. In the color check operation, a predetermined check chart is printed using the printing apparatus subjected to the color management, and a color measurement is performed on this chart using a colorimeter. The resultant colorimetric value is compared with a predefined target value (reference). Based on a comparison result, a judgment is made as to whether the color of the image printed by the printing apparatus satisfies a predetermined color quality criterion (as to whether the difference between the colorimetric value and the target value is smaller than or equal to a threshold value). In a case where the predetermined color quality criterion is satisfied (the color difference is smaller than or equal to the threshold value), it is approved to perform a following printing step. On the other hand, in a case where it is judged that the color of the image printed by the printing apparatus does not satisfy the predetermined color quality criterion (the color difference is greater than the threshold value), the color expert performs a color adjustment operation. More specifically, in the color adjustment operation, a calibration process is executed. The color adjustment operation includes, in addition to this calibration process, processes to check other various adjustment functions of the printing apparatus. After the function adjustment is completed, the color expert again performs the color check operation to check whether the color of the image printed by the printing apparatus has come to satisfy the predetermined color quality criterion. In a case where the desired color quality criterion is not satisfied even after the color adjustment operation is performed, the color expert performs a higher-level color adjustment operation including a fine adjustment of each function, regeneration of a color profile, and/or the like. Furthermore, the color expert may accumulate data indicating results of color check operations for later use to grasp a characteristic, or a change in characteristic with time, of the printing apparatus.

The color expert may have to perform the above-described color management operation on a plurality of printing apparatuses installed at print sites for which the color expert is responsible. In this case, a great workload is imposed on the color expert. Users of the color management system are not limited to color experts. For example, in some cases, an operator which actually operates a printing apparatus may perform an error recovery process including supplying paper, handling paper jam, or the like in the color check operation and may perform a color adjustment operation. In general, operators are low skill compared with color experts, and thus it may be difficult for operators to perform high-level color management operations with no help by color experts or the like. Thus, in color management operations, there is a need for a system in which even a low-skilled user is allowed to easily execute color management operations. It may also be desirable to improve operation efficiency to reduce a workload in color management for a plurality of printing apparatuses.

In recent years, various color management systems have been proposed. Japanese Patent Laid-Open No. 2010-201901 discloses an image forming apparatus configured such that a result obtained after a calibration is performed is compared with a target value, and a judgment is made on the color of an image printed by a printing apparatus subjected to the calibration. Based on a judgment result, a next operation to be performed by the printing apparatus (whether printing is continued or not) is determined.

When a color check operation is executed in a color management operation, it is necessary to set various kinds of operation information. Examples of operation information include an allowable range of a color difference between a colorimetric value and a target value, a printing condition setting in printing a chart image, etc. The operation information is set depending on a product model of a printing apparatus, a purpose, an image output characteristic, etc. Therefore, in a case where a plurality of printing apparatuses are managed at the same time, a color expert has to set operation information separately depending on each apparatus. Thus, the color expert has to have a high skill to grasp information on a plurality of printing apparatuses and apply the operation information to the respective printing apparatuses. Japanese Patent Laid-Open No. 2010-201901 discloses a technique in which when an image is printed by a printing apparatus after a calibration is executed, a color of the printed image is evaluated, and an error notification is issued depending on an evaluation result thereby achieving a partial automation in a color management operation which otherwise would be entirely performed by a user. However, what is achieved by this technique is only issuing an error notification based on a judgment of a color of an image printed by a printing apparatus, and nothing is disclosed as to a technique to more efficiently notify a user of a state of the printing apparatus being managed.

SUMMARY OF THE INVENTION

In view of the above, the present disclosure provides a technique to, in a color management system of managing a color of an image printed by a printing apparatus, efficiently notifying a user, who manages the printing apparatus, of a state of the printing apparatus.

In an aspect, the present disclosure provides an information processing apparatus capable of being connected to an image processing apparatus including an image forming unit, the information processing apparatus including an acquisition unit configured to acquire a judgment result indicating whether a colorimetric value obtained as a result of measuring the color of a chart image formed by the image forming unit satisfies a predetermined criterion in terms of a difference between the colorimetric value and a target value, a notification unit configured to notify the image processing apparatus that the judgment result acquired by the acquisition unit does not satisfy the criterion, and an instruction unit configured to, before the notification unit issues the notification to the image processing apparatus, instruct the image processing apparatus to execute an adjustment process.

Further features, aspects and advantages of the present invention will become apparent from the following description of exemplary embodiments with reference to the attached drawings. It should be understood that any of the features described herein in relation to a particular embodiment or set of embodiments may be combined with the features of one or more other embodiments without any limitations other than those imparted by the broadest aspects of the invention as defined hereinabove. In particular, features from different embodiments can be combined where necessary or where the combination of elements or features from individual embodiments in a single embodiment is beneficial.

BRIEF DESCRIPTION OF THE DRAWINGS

FIG. 20 is a diagram illustrating an example of a site management application UI screen.

FIG. 21 is a diagram illustrating an example of a site management application UI screen.

FIG. 26 is a flow chart illustrating a process according to a second embodiment.

FIG. 27 is a flow chart illustrating a process according to a second embodiment.

FIG. 29 is a sequence diagram illustrating a process performed in a color management system.

FIG. 30 is a sequence diagram illustrating a process performed in a color management system.

DESCRIPTION OF THE EMBODIMENTS

Embodiments of the present disclosure are described below with reference to drawings.

First Embodiment

Figure 1:
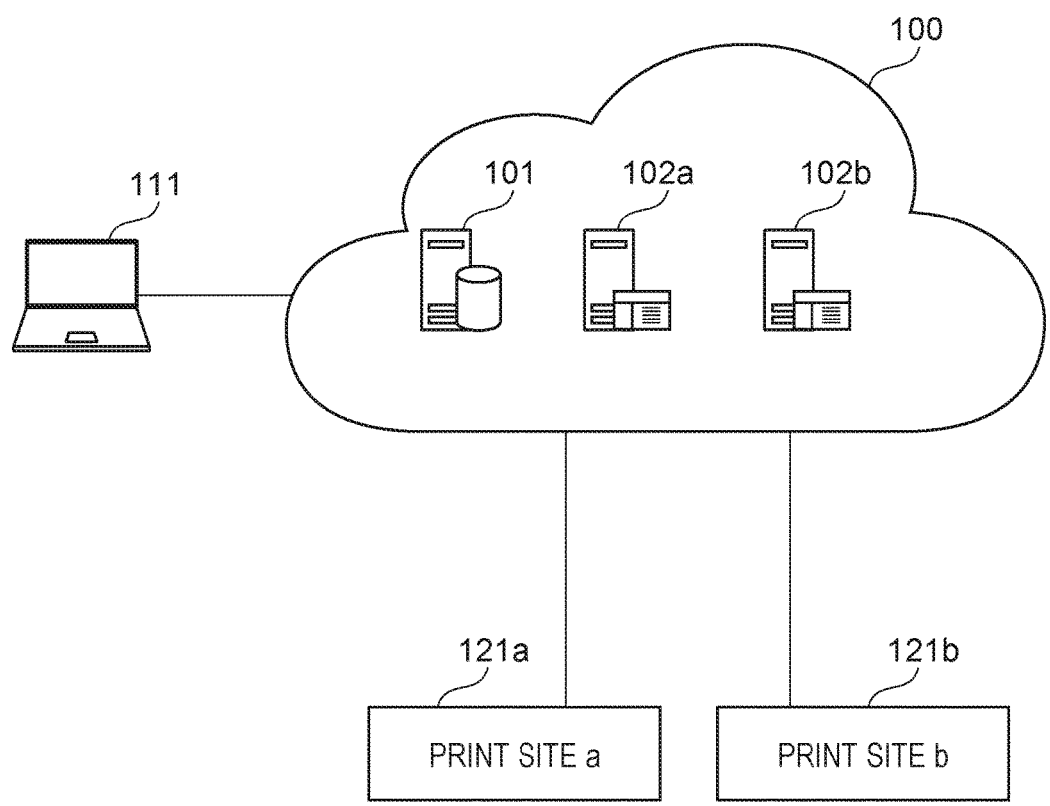
FIG. 1 a diagram illustrating an overall configuration of a color management system.

FIG. 1 is a diagram illustrating an outline of a system configuration according to a first embodiment of the present disclosure. In this example, the system includes a centralized management site, a print site a (121*a*), and a print site b (121*b*). The centralized management site manages all print sites installed at various sites at different locations. In the present embodiment, by way of example, each print site 121 includes at least one printing apparatus 221. The system according to the present embodiment is not limited to this example, but a greater number of print sites 121 may be operated under the management of the centralized management site.

Figure 2:
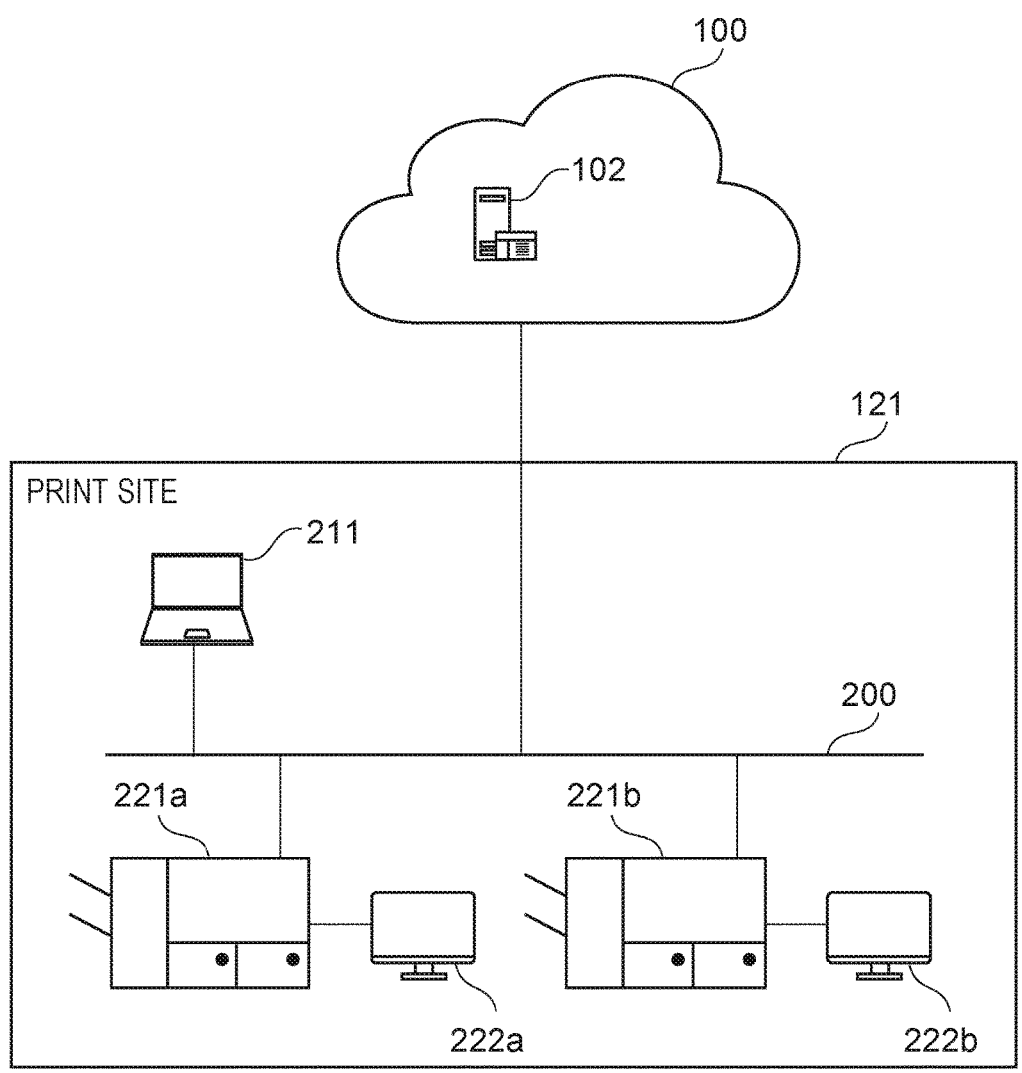
FIG. 2 is a diagram illustrating a print site and some other related units.

FIG. 2 illustrates a part of the system configuration according to the first embodiment of the disclosure, that is, the print site a (121*a*) and other related parts are shown in FIG. 2.

A cloud environment 100 includes a cloud server such as a site management server 102 and a centralized management server 101 which will be described later. The cloud environment 100 provides various services to terminal apparatuses connected via the Internet. In the present embodiment, by way of example, it is assumed that the site management server 102 and the centralized management server 101 are cloud servers. Alternatively, for example, a centralized management server 101 and a site management server 102 may be installed respectively at a site where a centralized management operations is performed and at a print site 121, and they may be operated on-premise.

Site management servers 102a and 102b are servers that respectively manage printing apparatuses 221 (221a, 221b) operated at the print site a (121a) and the print site b (121b). The site management server 102 acquires information associated with the printing apparatuses 221 (221a and 221b) that the site management servers 102 mange. Each site management server 102 transmits various control instructions to a printing apparatus 221 (221a or 221b) located at a site that the site management server 102 manages. Furthermore, the site management server 102 transmits information associated with the printing apparatus operating at the cites under the management to the centralized management server 101 which will be described later.

Note that the site management server 102 is a cloud server installed in the cloud environment 100. The site management server 102 is connected to a site management terminal 211 and the centralized management server 101, which will be described later, via the Internet. The centralized management server 101 is a server that integratedly manages information regarding at least one print site 121. The centralized management server 101 acquires information associated with each print site 121 from the site management server 102. Examples of the print site information include a utilization factor of the printing apparatus 221 under the management, an amount of usage and a remaining amount of each of various consumables, a predicted life of a part of the printing apparatus 221, etc. The centralized management server 101 transmits the above-described print site information (the information associated with printing apparatuses operating at print sites) to the centralized management terminal 111.

The centralized management server 101 is a cloud server installed in the cloud environment 100. This centralized management server 101 is connected to the site management server 102 and the centralized management terminal 111 via the Internet. The centralized management terminal 111 is a terminal used by a manager responsible for centralized management at a centralized management site. The centralized management terminal 111 displays print site information received from the centralized management server 101 on a display unit (not illustrated). The manager responsible for centralized management checks the print site information displayed on the display unit to grasp the utilization factor of the printing apparatus 221 at each print site 121 and/or costs of consumables.

The site management terminals 211a and 221b are terminals (information processing apparatuses) used by color experts who respectively manage the print site a (121a) and print site b (121b). The site management terminal 211 communicates with the site management server 102 and displays information associated with the printing apparatus 221 at the site on the display unit (not illustrated). The color expert refers to the displayed information associated with the printing apparatus 221 and uses the information in a color management operation. The color management operation is a work performed to achieve a desired color quality criterion for a color of an image printed by the printing apparatus, and the color management operation includes a plurality of steps. More specifically, for example, the color management operation includes a check operation (color check operation) to check a color value of an image printed by a printing apparatus, a color adjustment operation to make an adjustment such that the color value of the printed image satisfies a color quality criterion.

The site management terminal 211 accepts an instruction issued by the color expert and transmits various execution instructions to the printing apparatus 221 at the print site 121.

The printing apparatus 221 is an apparatus that operates at each print site 121. The printing apparatus 221 is, for example, an electrophotographic printer or an ink-jet printer. In some cases, the printing apparatus 221 is configured such that it includes a printer and one or more other devices connected to the printer. For example, the printer is connected to a sheet feeding apparatus for extending a sheet feed capacity and/or a post-processing apparatus for performing various post-processes on a sheet output from the printer. Furthermore, in some cases, a printer server (not shown) is connected to extend printing functions.

The operator terminal 222 is an apparatus for use by an operator of each printing apparatus to perform various operations using the printing apparatus 221. More specifically, for example, the various operations include setting sheet information regarding sheets placed on a sheet feeding apparatus, issuing an instruction to execute an adjustment function of the printing apparatus, etc. In the present embodiment, it is assumed, by way of example but not limitation, that the operation unit 512 of the printing apparatus 221 functions as the operator terminal 222. For example, in a case where a print server is connected to the printer, an input/output apparatus of the print server may be used as the operator terminal 222. An in-site network 200 connects various apparatuses to each other at the print site 121 and it also connects each apparatus to an external network.

Next, a hardware configuration of each of various apparatuses according to the present embodiment is described.

Figure 3:
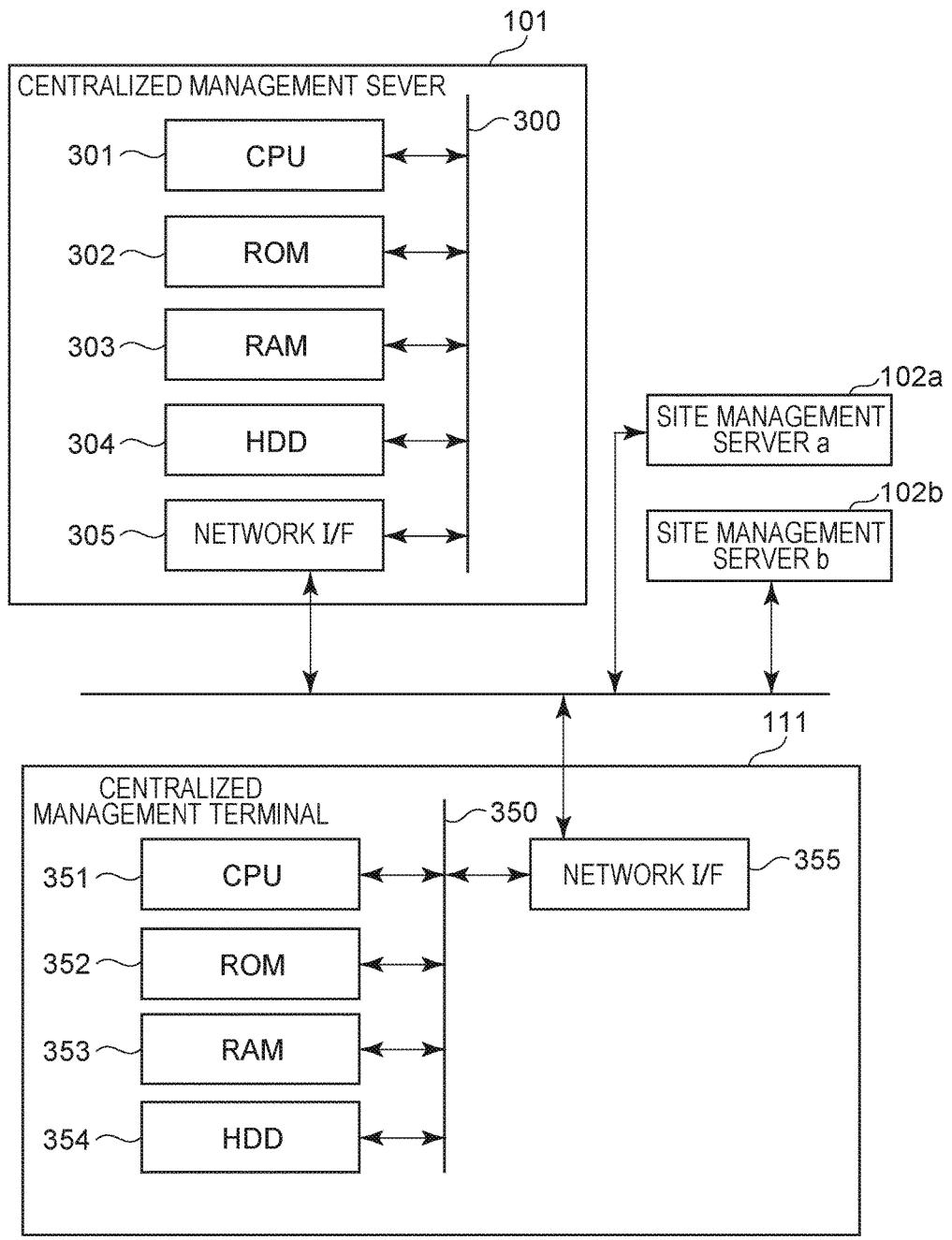
FIG. 3 is a diagram illustrating a hardware configuration of a centralized management server and a hardware configuration of a centralized management terminal.

FIG. 3 is a block diagram illustrating a hardware configuration of a centralized management system chiefly including the centralized management server 101 and the centralized management terminal 111.

First, a hardware configuration of the centralized management server 101 is described.

A CPU 301 generally controls accessing various devices connected to a system bus 300, based on a control program stored in a ROM 302 or a hard disk (HDD) 304. The ROM 302 stores a control program and/or the like executable by the CPU 301. A RAM 303 functions chiefly as a main memory, a work area, or the like used by the CPU 301. The memory capacity of the RAM 303 can be increased by connecting an optional RAM to an extension port (not illustrated). The hard disk (HDD) 304 stores a boot program, various application programs, font data, a user file, an edition file, and/or the like. Note that instead of the HDD 304 used in the present example, other types of storage devices such as an SD card, a flash memory, or the like may be used as an external storage device. A network I/F 305 performs data communication with the centralized management terminal 111 or the site management server 102 (in the example shown in FIG. 3, the site management server a 102a, or the site management server b 102b) via a network.

Next, a hardware configuration of the centralized management terminal 111 is described below.

A CPU 351 generally controls accessing various devices connected to a system bus 350, based on a control program stored in a ROM 352 or a hard disk (HDD) 354. The ROM 352 stores a control program and/or the like executable by the CPU 351. A RAM 353 functions chiefly as a main memory, a work area, or the like used by the CPU 351. The memory capacity of the RAM 353 can be increased by connecting an optional RAM to an extension port (not illustrated). The hard disk (HDD) 354 stores a boot program, various application programs, font data, a user file, an edition file, and/or the like. Note that instead of the HDD 354 used in the present example, other types of storage devices such as an SD card, a flash memory, or the like may be used as an external storage device. A network I/F 355 performs data communication with the centralized management server 101 via a network.

Figure 4:
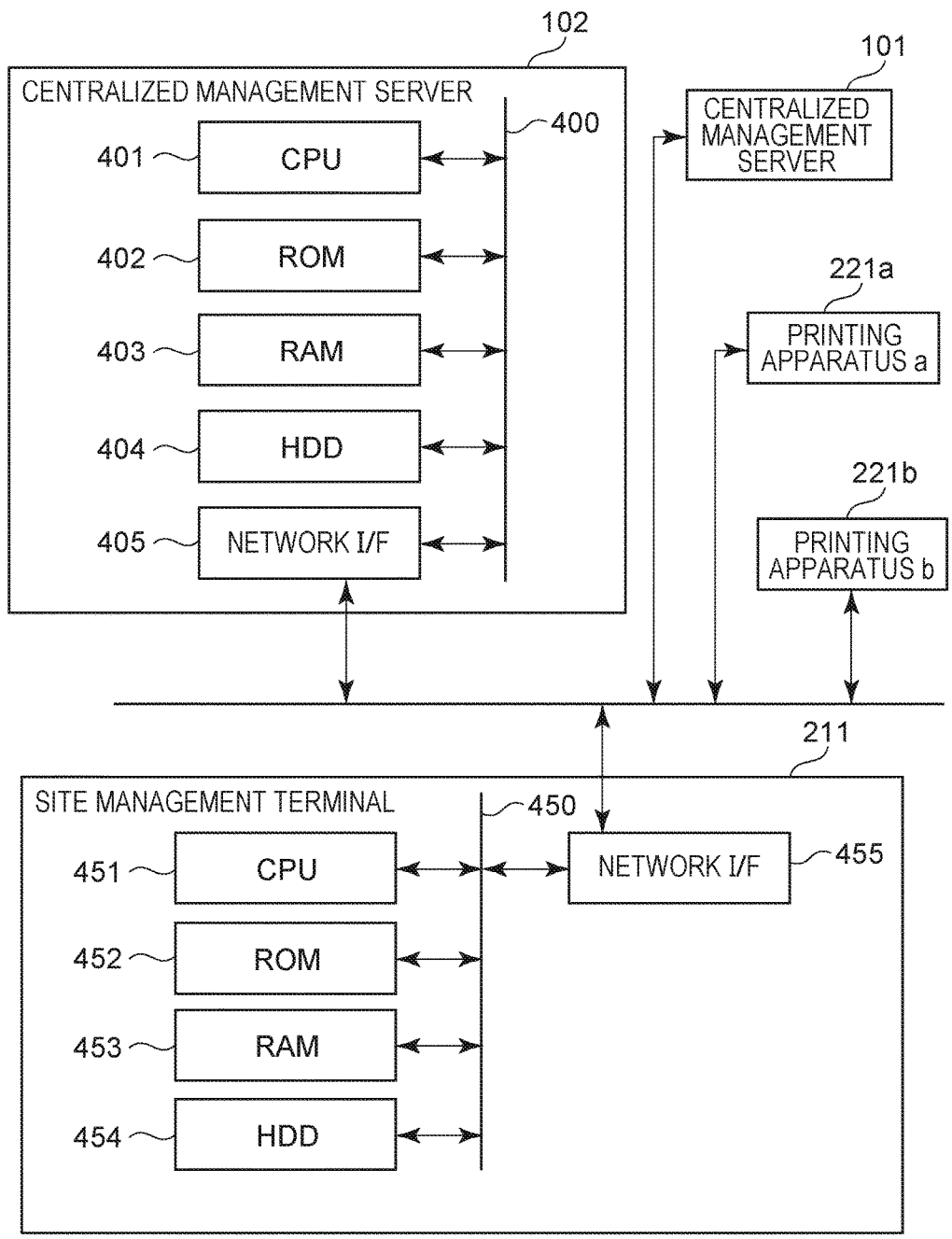
FIG. 4 is a diagram illustrating a hardware configuration of a site management server and a hardware configuration of a site management terminal.

FIG. 4 is a block diagram illustrating a hardware configuration of a site management system chiefly including the site management server 102 and the site management terminal 211. First, a hardware configuration of the site management server 102 is described below.

A CPU 401 generally controls accessing various devices connected to a system bus 400, based on a control program stored in a ROM 402 or a hard disk (HDD) 404. The ROM 402 stores a control program and/or the like executable by the CPU 401. A RAM 403 functions chiefly as a main memory, a work area, or the like used by the CPU 401. The memory capacity of the RAM 403 can be increased by connecting an optional RAM to an extension port (not illustrated). The hard disk (HDD) 404 stores a boot program, various application programs, font data, a user file, an edition file, and/or the like. Note that instead of the HDD 404 used in the present example, other types of storage devices such as an SD card, a flash memory, or the like may be used as an external storage device. A network I/F 405 perform data communication with the centralized management server 101, the site management terminal 211, and the printing apparatus 221 via a network.

Next, a hardware configuration of the site management terminal 211 is described below.

A CPU 451 generally controls accessing various devices connected to a system bus 450, based on a control program stored in a ROM 452 or a hard disk (HDD) 454. The ROM 452 stores a control program and/or the like executable by the CPU 451. A RAM 453 functions chiefly as a main memory, a work area, or the like used by the CPU 451. The memory capacity of the RAM 453 can be increased by connecting an optional RAM to an extension port (not illustrated). The hard disk (HDD) 454 stores a boot program, various application programs, font data, a user file, an edition file, and/or the like. Note that instead of the HDD 454 used in the present example, other types of storage devices such as an SD card, a flash memory, or the like may be used as an external storage device. A network I/F 455 perform data communication with the site management server 102 via a network.

Figure 5:
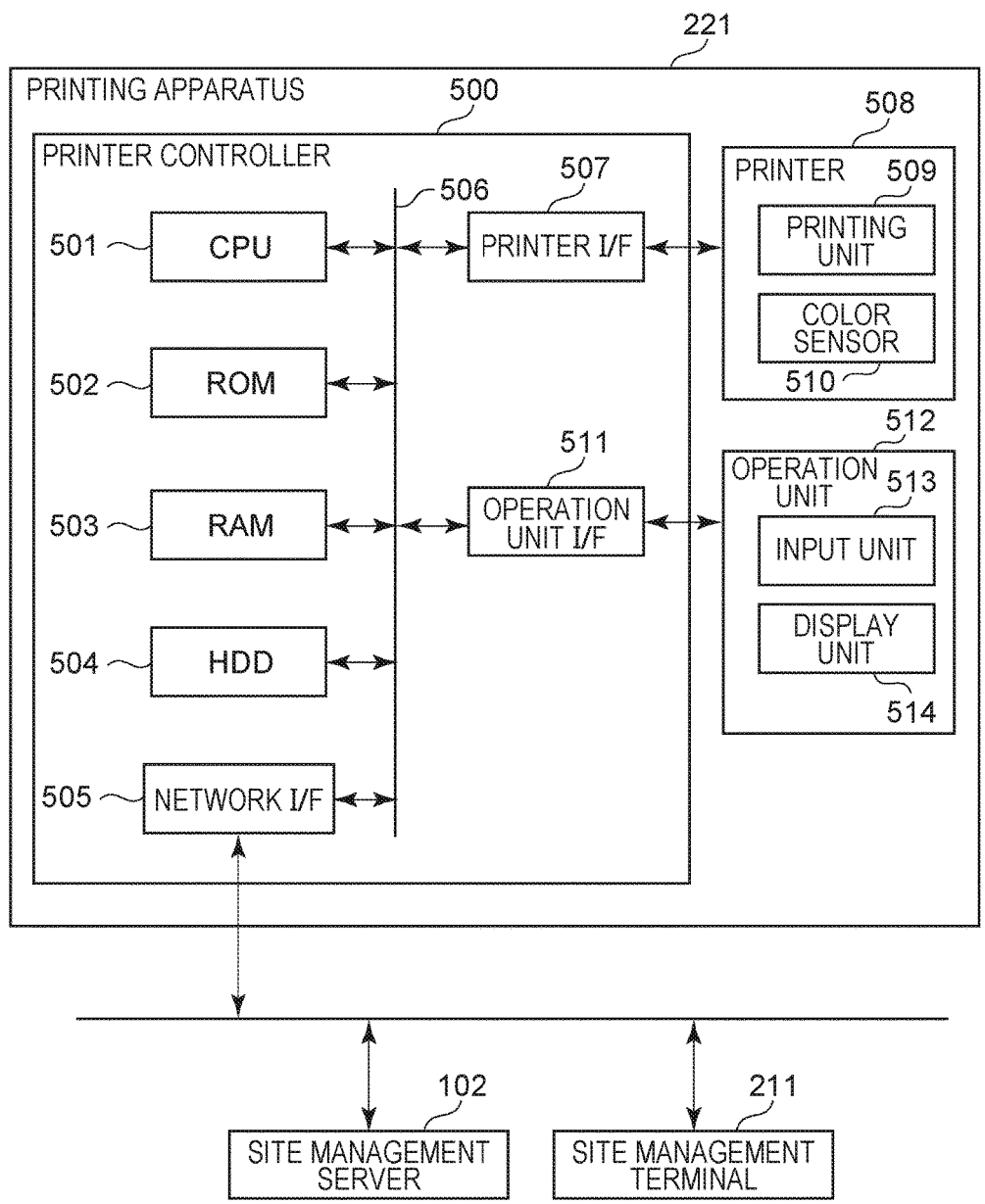
FIG. 5 is a diagram illustrating a hardware configuration of a printing apparatus.

FIG. 5 is a diagram illustrating a hardware configuration of a printing apparatus 221 functioning as an image processing apparatus.

A printer controller 500 is a controller of the printing apparatus 221. The printer controller 500 performs processes necessary in a printing operation, such as analysis of a given print job, a conversion into image data, etc. In the following description, it is assumed by way of example but not limitation that these processes necessary in printing are performed by the printer controller 500 of the printing apparatus 221. Alternatively, a print server (not illustrated in the figure) connected to the printing apparatus 221 may perform processes including receiving a print job, analyzing the received print job, converting the print job into image data, and so on. In this case, the print server transmits the resultant converted image data and other various data necessary in the printing operation to the printing apparatus 221. The printing apparatus 221 performs the printing operation using the printer 508 according to the data received from the print server. A CPU 501 generally controls accessing various devices connected to a system bus 506, based on a control program stored in a ROM 502 or a hard disk (HDD) 504. The ROM 502 stores a control program and/or the like executable by the CPU 501. A RAM 503 functions chiefly as a main memory, a work area, or the like used by the CPU 501. The memory capacity of the RAM 503 can be increased by connecting an optional RAM to an extension port (not illustrated). The hard disk (HDD) 504 stores, a boot program, various application programs, font data, a user file, an edition file, and/or the like. Note that instead of the HDD 504 used in the present example, other types of storage devices such as an SD card, a flash memory, or the like may be used as an external storage device. A network I/F 505 performs data communication with the site management server 102 or the site management terminal 211 via a network. A printer I/F 507 controls outputting of an image to the printer 508. The printer I/F 507 receives a color measurement result by controlling a color sensor 510 disposed inside the printer 508. The printer 508 includes at least an image forming unit (printing unit) 509 that performs a printing operation and the color sensor 510 that measures a color of a printed matter. The printer 508 may be connected to an apparatus (not illustrated) such as a sheet feeding apparatus, a post-processing apparatus, or the like.

In the present embodiment, at least one color sensor 510 is disposed, in the printing apparatus 211, in a sheet conveying path between a fixing unit of the printing unit 509 and a paper output slit. The color sensor 510 is capable of measuring a color of an image obtained after being transferred to a sheet and fixed. As a result of the color measurement performed by the color sensor 510, data is obtained in terms of, for example, a spectral value, a chromaticity value, and/or a density. Using the color sensor 510, a color measurement may be performed on a chart image printed by the printing unit 509, and a correction table may be generated based on a difference between the color measurement result and a target value. Thus, a user does not have to place the chart image on a sensor to perform a color measurement on the chart image. That is, use of the color sensor described above makes it possible to automatically execute the calibration.

An operation unit I/F 511 controls a displaying operation of a display unit 514 on the operation unit 512 and also controls inputting of various kinds of information received from an operator via an input unit 513. In the present embodiment, as described above, the term "operation unit 512" is used to describe the same meaning as that of "operator terminal 222.

Next, software configurations of various apparatuses according to the present embodiment are described below.

Figure 6A:
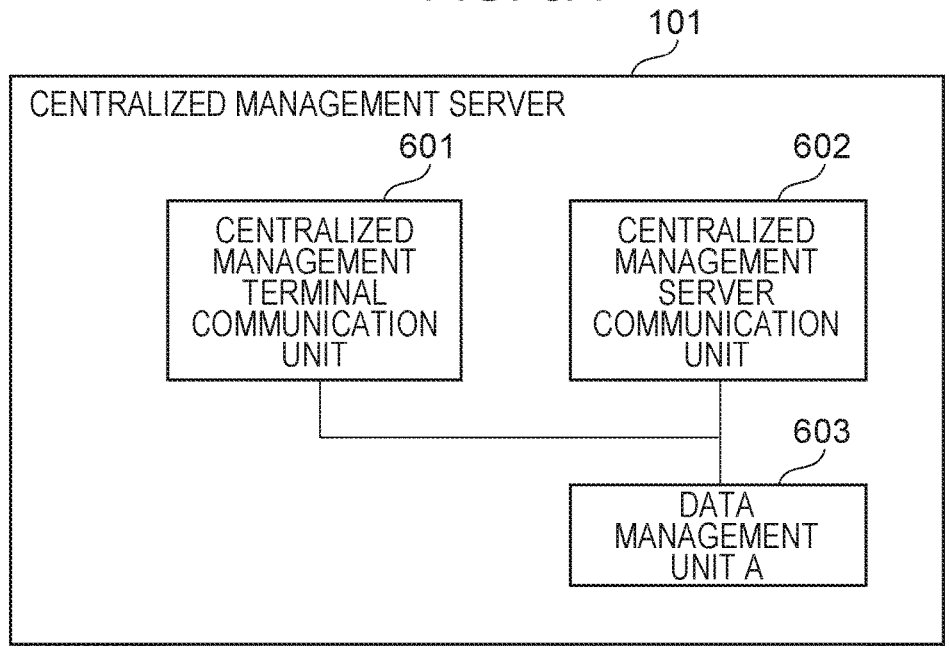
FIG. 6A is a diagram illustrating a software configuration of a centralized management server.

FIG. 6A is a block diagram illustrating a software configuration of the centralized management server 101. These software modules in the software configuration are stored as programs in the HDD 304. The programs are loaded into the RAM 303 and executed by the CPU 301.

The centralized management terminal communication unit 601 performs data communication with the centralized management terminal 111. For example, the centralized management terminal communication unit 601 generates data for use in a centralized management application operated on the centralized management terminal 111, and transmits the generated data to the centralized management terminal 111. The communication unit 601 of the centralized management terminal 111 receives various instructions issued by a manager responsible for centralized management via the centralized management application.

The site management server communication unit 602 performs data communication with the site management server 102 to acquire information on the print site 121 subjected to the color management. More specifically, for example, color data information associated with the printing apparatus 221 at the print site 121 is acquired. The color data information may include a colorimetric value of an image printed by the printing apparatus, a color difference between the colorimetric value and a target value, a judgment result indicating whether the color difference is smaller than or equal to a threshold value, a color measurement condition (profile) used in the color measurement, and/or the like. The site management server communication unit 602 transmits various control instructions to the site management server 102 according to instructions received from the manager responsible for centralized management in the centralized management application. For example, the site management server communication unit 602 instructs a change in notification intervals at which a notification on color data information associated with each printing apparatus is repeatedly transmitted from the site management server 102 to the centralized management server 101.

A data management unit A 603 stores various kinds of data associated with the centralized management process and manages the stored data. For example, the data management unit A 603 stores data of color data information or the like associated with the print site 121 acquired by the site management server communication unit 602. The data management unit A 603 also stores various kinds of content data to be transmitted to the centralized management terminal 111 for use in executing the centralized management application.

Figure 6B:
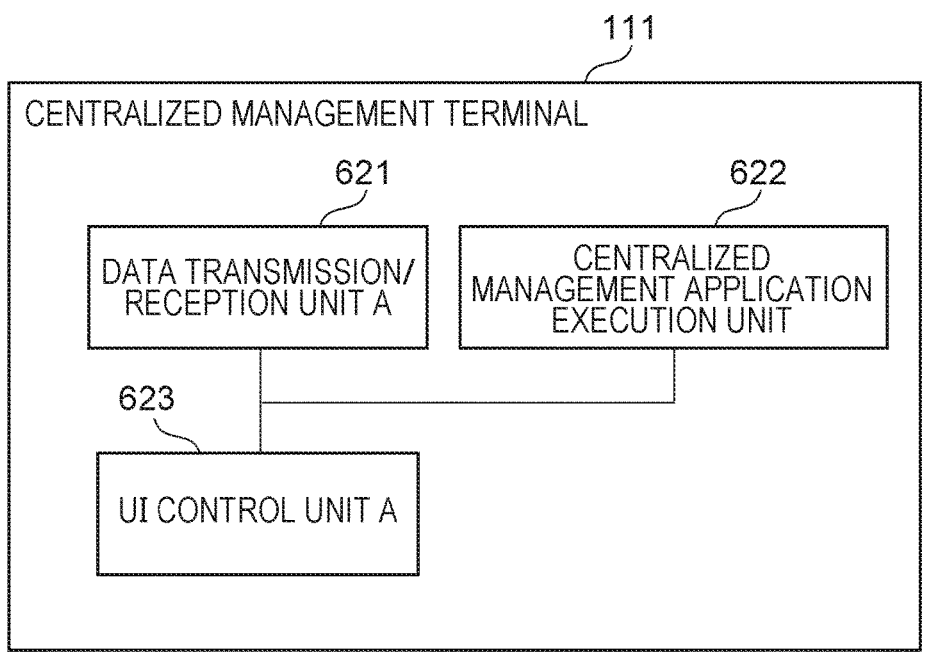
FIG. 6B is a diagram illustrating a software configuration of a centralized management terminal.

FIG. 6B is a block diagram illustrating a software configuration of the centralized management terminal 111. These software modules in the software configuration are stored as programs in the HDD 354. The programs are loaded into the RAM 353 and executed by the CPU 351.

A data management unit A 621 performs data communication with the centralized management server 101. For example, the data management unit A 621 receives various kinds of content data to be displayed on a centralized management application from the centralized management server 101, and transmits various kinds of instruction information accepted from the manager responsible for centralized management in the centralized management application to the centralized management server 101. More specifically, for example, the data management unit A 621 transmits color data information associated with each printing apparatus at the print site 121 under the management of the data management unit A 621.

A centralized management application execution unit 622 executes an application for managing information associated with the print site 121 managed by the manager responsible for centralized management.

A UI control unit A 623 chiefly performs a process relating to displaying a UI screen in the centralized management application and accepting an inputting operation performed by a user.

Figure 7A:
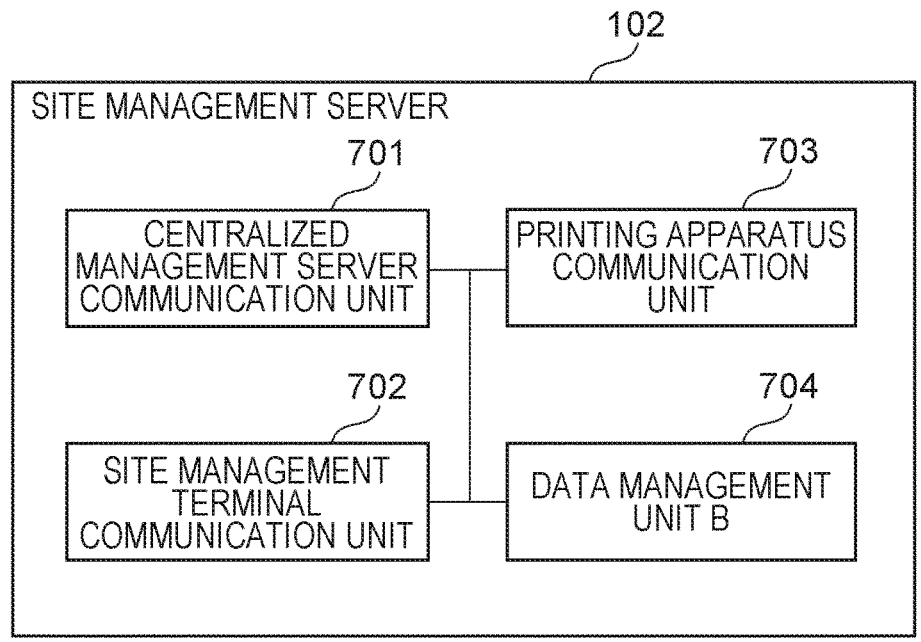
FIG. 7A is a diagram illustrating a software configuration of a site management server.

FIG. 7A is a block diagram illustrating a software configuration of the site management server 102. These software modules in the software configuration are stored as programs in the HDD 404. The programs are loaded into the RAM 403 and executed by the CPU 401.

A centralized management server communication unit 701 performs data communication with the centralized management server 101. For example, the centralized management server communication unit 701 transmits various kinds of information associated with the print site 121 to the centralized management server 101, and receives an instruction from the centralized management server 101 and performs various control operations according to the received instruction.

A site management terminal communication unit 702 performs data communication with the site management terminal 211. For example, the site management terminal communication unit 702 generates data for use in a site management application operated on the site management terminal 211, and transmits the generated data to the site management terminal 211. Furthermore, the site management terminal communication unit 702 receives various instructions issued by a color expert via a site management application. For example, the site management terminal communication unit 702 receives an instruction indicating an additional process to be performed by the printing apparatus 221 under the management, an instruction to execute a color check process to be performed by the particular printing apparatus 221.

A printing apparatus communication unit 703 performs data communication with the printing apparatus 221. For example, the printing apparatus communication unit 703 transmits an instruction to the printing apparatus 221 to execute a color check process or a color adjustment process according to an instruction accepted from a color expert via a site management application. In a case where the instruction to execute the color adjustment process is transmitted by the printing apparatus communication unit 703, the printing apparatus communication unit 703 acquires, from the printing apparatus 221, result information indicating a result of the color adjustment process performed by the printing apparatus 221. On the other hand, in a case where the instruction to execute the color check process is transmitted by the printing apparatus communication unit 703, the printing apparatus communication unit 703 acquires data indicating a result of the color measurement on a chart image performed by the color sensor 510 of the printing apparatus 221. The acquired data is to be used in a judgment control of the color check process. The received colorimetric value is compared with a target value preset in a data management unit B 704 which will be described later, and a difference (color difference) is calculated. In a case where the calculated difference is smaller than or equal to a predetermined threshold value, it is determined that a color of an image printed by the printing apparatus 221 satisfies a required color quality criterion. That is, the color quality criterion is satisfied when the difference of the colorimetric value of the color of the printed image from the predetermined target value (reference) is small.

When it is determined that the printing apparatus is currently in a state in which the color value of the image printed by the printing apparatus satisfies the color quality criterion, the printing apparatus communication unit 703 instructs the data management unit B 704 to store the color check process result and instructs the UI control unit B 723 (described later) to displays the result. On the other hand, in a case where the above-described difference is greater than the threshold value, it is determined that the color of the image printed by the printing apparatus 221 does not satisfy the color quality criterion. In this case, the printing apparatus communication unit 703 transmits a recovery process setting relating to the color check process to the printing apparatus 221. For example, in the recovery process, a color adjustment process (calibration) is automatically performed by the printing apparatus 221. Furthermore, after the color adjustment process is completed, the printing apparatus communication unit 703 again performs the color check process.

The data management unit B 704 stores various kinds of data associated with site management processes and manages the stored data. For example, the data management unit B 704 stores data associated with the printing apparatus 221 acquired by the printing apparatus communication unit 703. Furthermore, the data management unit B 704 stores various kinds of content data to be transmitted to the site management terminal 211 for use in executing the site management application. Furthermore, the data management unit B 704 stores setting information, target value information, or the like relating to the color check process or the color adjustment process and manages the stored information.

Figure 7B:
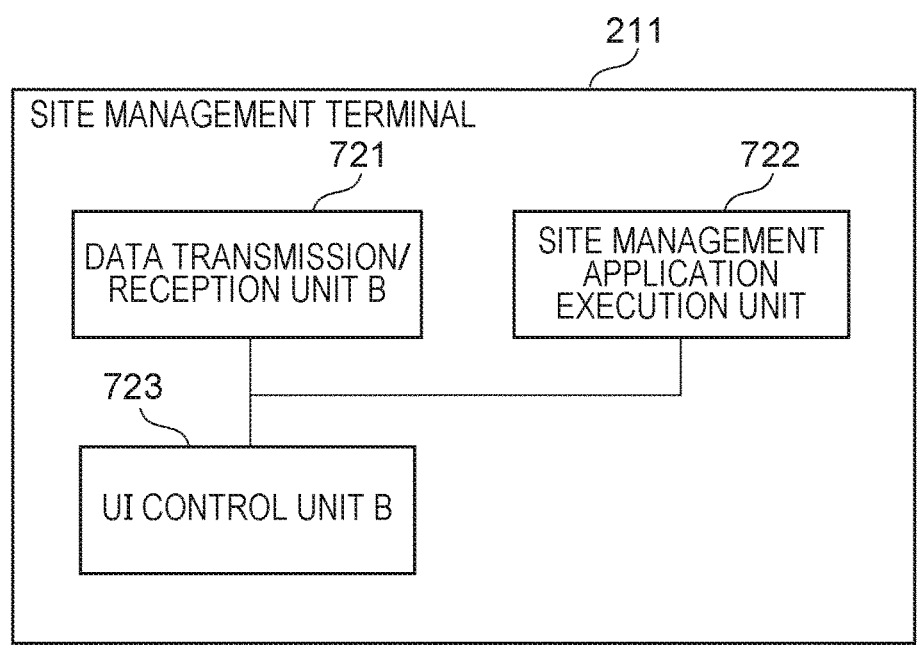
FIG. 7B is a diagram illustrating a software configuration of a site management terminal.

FIG. 7B is a block diagram illustrating a software configuration of the site management terminal 211. These software modules in the software configuration are stored as programs in the HDD 454. The programs are loaded into the RAM 453 and executed by the CPU 451.

A data transmission/reception unit B 721 performs data communication with the site management server 102. For example, the data transmission/reception unit B 721 receives various kinds of content data to be displayed on a site management application from the site management server 102. The data transmission/reception unit B 721 transmits various kinds of instruction information accepted from a color expert on the site management application to the site management server 102. For example, the various kinds of instruction information include an instruction to instruct the printing apparatus 221 under the management to perform an additional process, an instruction to instruct the particular printing apparatus 221 to execute a color check process, or the like.

A site management application execution unit 722 executes an application for managing the printing apparatus 221 under the management by a color expert. The site management application execution unit 722 acquires information associated with the printing apparatus 221 at the print site 121 from the site management server 102. Furthermore, the site management application execution unit 722 transmits various control instructions accepted from a color expert via the UI control unit B 723, to control the printing apparatus 221, to the site management server 102.

The UI control unit B 723 executes mainly a process relating to displaying a site management application UI screen and a process relating to accepting an input operation by a user.

Figure 8:
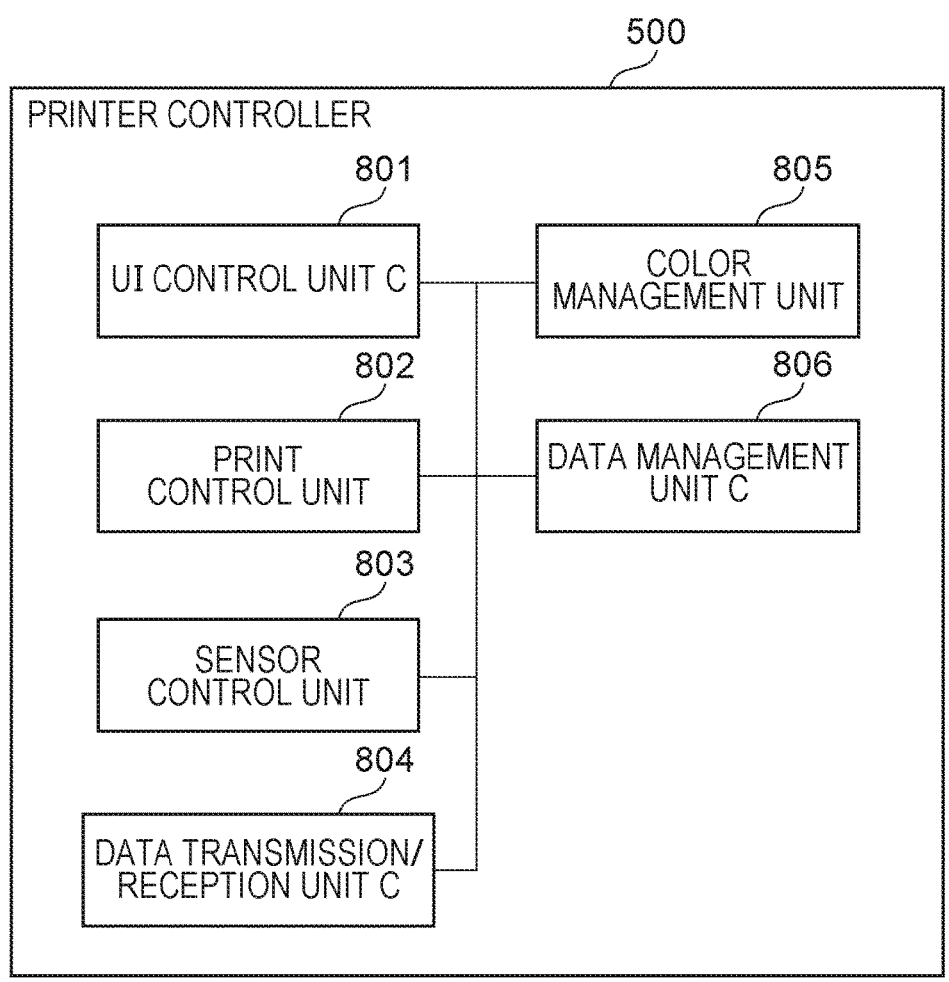
FIG. 8 is a diagram illustrating a software configuration of a printing apparatus.

FIG. 8 is a block diagram illustrating a software configuration of the printing apparatus 221. These software modules in the software configuration are stored as programs in the HDD 504. The programs are loaded into the RAM 503 and executed by the CPU 501.

A UI control unit C 801 controls a displaying operation of the display unit 514 of the printing apparatus 221 and controls an inputting operation of the input unit 513.

A print control unit 802 generates and manages print job data based on a print job execution instruction. More specifically, for example, the print control unit 802 performs processes necessary in the printing operation, such as analyzing the print job, converting it to image data, an image compression/decompression process, etc. The print control unit 802 also performs writing/reading the generated print job to/from the HDD 504, managing a history of print jobs which have been subjected to the printing operation.

A sensor control unit 803 controls the color sensor 510. More specifically, for example, in response to an instruction from the print control unit 802, the sensor control unit 803 executes a color measurement process on a printed matter such as a chart image used in the calibration. A result of the color measurement is transmitted to a color management unit 805 or a data management unit C 806 which will be described later, or the result of the color measurement is transmitted to an external apparatus via a data transmission/reception unit C 804.

The data transmission/reception unit C 804 manages data transmission/reception to/from the site management server 102. For example, the data transmission/reception unit C 804 transmits chart color measurement results relating to checking various functions (described later) of the printing apparatus 221 or execution result information to the site management server 102. Furthermore, the data transmission/reception unit C 804 transmits and receives, to/from an external apparatus, data relating to outputting of an ordinal print job other than the data relating to the color management.

The color management unit 805 controls processes to execute various functions to manage color quality of images printed by the printing apparatus 221. More specifically, for example, in a case where a difference of a colorimetric value of measured chart data received from the printing apparatus 221 from a target value (reference) is smaller than or equal to a threshold value, it is determined that the color quality is satisfied. The color management unit 805 manages this color quality.

The operation of the color management unit 805 is described in further detail below with reference to specific examples of control processes performed by the color management unit 805.

A color check process is performed to check color quality, as of when the process is executed, of an image printed by the printing apparatus 221. When a condition to start the color check process (color check execution condition) is satisfied, the color management unit 805 acquires chart data from the data management unit C 806 which will be described later. An example of the color check execution condition is that printing has been performed a greater number of times than a predetermined number of times. Another example of the color check execution condition is that a length of a period elapsed since the previous execution of the color check process is greater than or equal to a predetermined value. When the color check execution condition is satisfied, an instruction to print the acquired chart data is given to the print control unit 802. In a case where an instruction is also issued to perform a color measurement using the color sensor 510 on a chart image printed based on the chart data, the color measurement instruction to the color sensor 510 is also transmitted together with the print instruction to the print control unit 802. However, alternatively, the color management unit 805 may transmit the color measurement instruction directly to the sensor control unit 803. When a result of the color measurement of the printed chart image is acquired, the color management unit 805 transmits the acquired color measurement result to the site management server 102 via the data transmission/reception unit C 804. After the transmission of the color measurement result, the color management unit 805 receives a result of the judgment based on the color measurement result from the site management server 102. In a case where the judgment result indicates that the color measurement result is not good (that is, the desired color quality criterion is not satisfied), a recovery control instruction is received together with the judgment result from the site management server 102. The printer controller 500 controls various software modules depending on the received instruction.

In the present embodiment, by way of example, the judgment process based on the color measurement result is performed by the site management server 102. However, alternatively, the judgment process based on the color measurement result may be performed by the printing apparatus 221. In this case, the color management unit 805 calculates the difference of the colorimetric value from a target value preset in the data management unit C 806, and judges whether the calculated difference is smaller than or equal to a predefined threshold value (that is, whether the desired color quality criterion is satisfied). In a case where the judgment result is unacceptably bad (the difference is greater than the threshold value), a process is performed according to a following recovery control instruction received from the site management server 102.

Next, the color adjustment process is explained.

The color adjustment process is achieved by a known calibration function. To optimize a plurality of factors that may influence the color quality, various functions are provided. Of these various functions, in the following description of the color adjustment process, a gray level correction function is discussed.

In the color adjustment process, first, a chart image is printed according to the chart data, and then the color measurement is performed on the printed chart image. The printing of the chart image based on the chart data, and the color measurement on the chart image may be performed in a similar manner as described above in the explanation of the color check process, and thus a further description thereof is omitted.

A correction parameter is then calculated such that the correction parameter has a value that can delete the difference between the color measurement result and the target value preset in the data management unit C 806, and the calculated correction parameter is stored in the data management unit C 806. This correction parameter is applied later when a print job is output and an image is printed.

Next, the color profile generation process is described. In the color profile generation process, a color profile (technique of which is known) is generated according to a desired condition specified by a user of the printing apparatus. The color management unit 805 generates a color profile depending on a result of color measurement on a chart image printed according to chart data. The printing of the chart image based on the chart data, and the color measurement on the chart data may be performed in a similar manner as described above in the explanation of the color check process, and thus a further description thereof is omitted. The generated color profile is stored in the data management unit C 806. This color profile is applied later when the print control unit 802 executes a print job to which the color profile is to be applied.

The data management unit C 806 stores and manages data associated with management (color management) of the result of the color measurement on the color of the image printed by the printing apparatus 221. Examples of the data associated with the color management include setting information of the color check process and/or the color adjustment process, the preset target value, the colorimetric value, execution logs of various processes, the color profile, a correction table, the color management parameter data, etc., which will be applied to print jobs.

The data management unit C 806 may also store and manage data other than the color management data. Examples of such data include data indicating the device configuration of the printing apparatus 221, data relating to consumables, etc.

Next, functions provided by the color management system according to the present embodiment are described.

FIG. 29 is a sequence diagram illustrating an example of a function provided by the color management system according to the present embodiment. Function of acquiring information on color state at print site in response to an instruction issued by a manager responsible for centralized management In response to an operation performed by a manager responsible for centralized management, the centralized management terminal 111 requests the centralized management server 101 to provide color data information associated with printing apparatuses under management installed at all print sites (HQT_S01).

In receiving this request, the centralized management server 101 transmits a color state information acquisition request to one or more site management servers 102 under the management to acquire color data information associated with the printing apparatuses 221 under the management installed at sites (HQS_S01).

The site management server 102 acquires, from the data management unit B, color data information associated with all printing apparatuses 221 installed at the print site under the management (S2901), and the site management server 102 transmits the acquired color data information to the centralized management server 101 (FS_S01).

The centralized management server 101 stores, in the data management unit A, the color data information associated with each site received from the site management server 102 (S2902). The centralized management server 101 transmits the color data information associated with the sites to the centralized management terminal 111. The centralized management terminal 111 displays the received color data information on the UI of the centralized management terminal 111 (HQS_S02). Notification of color data information associated with print site In response to an operation performed by a manager responsible for centralized management, the centralized management terminal 111 transmits an instruction to the centralized management server 101 to set intervals at which color data information associated with the printing apparatus operating at each site is to be transmitted (HQT_S02). In response to receiving this instruction, the centralized management server 101 transmits an instruction to one or more site management servers 102 under the management to set the interval at which color data information associated with the printing apparatus operating at the site is to be transmitted (HQS_S03). The site management server 102 stores, in the data management unit B, setting information indicating the color data information notification intervals received from the centralized management server 101 (S2903).

Thereafter, the site management server 102 detects, based on the notification interval setting information, that a time has come to transmit the color data information associated with printing apparatuses operating at the sites to the centralized management server (that is, the site management server 102 detects that the color state information notifying condition is satisfied) (S2904). Each time it is detected that the color state information notifying condition is satisfied for printing apparatuses, the site management server 102 transmits the color data information associated with the printing apparatuses operating at the site to the centralized management server 101 (FS_S02).

FIG. 30 is a sequence diagram illustrating an example of a function provided by the color management system according to the present embodiment.

Manual Execution of Color Check Process

In response to an operation performed by a color expert, the site management terminal 211 transmits a color check process execution request to the site management server 102 to execute the color check process for a particular printing apparatus 221 (FT_S01). In the following description, it is assumed by way of example that the received color check process execution request indicates that the color check process is to be executed for the printing apparatus 221a. Note that the details of the color check process have been already described above. In response to receiving the instruction, the site management server 102 transmits the color check process execution request to the printing apparatus 221a (FS_S03).

In response to receiving the execution request, the printing apparatus 221a executes the color check process (S3001). The printing apparatus 221a transmits to the site management server 102 data indicating a result of measurement of the chart image sensed by the color sensor (P_S01). The site management server 102 analyzes the measurement data received from the printing apparatus 221a and stores an analysis result in the data management unit B (S3002).

Displaying Color Check Process Result

In response to an operation performed by a color expert, the site management terminal 211 transmits, to the site management server 102, a request for acquisition of color data information associated with printing apparatuses installed at the site (FT_S02). In response to receiving this request, the site management server 102 acquires, from the data management unit B, color data information associated with the printing apparatuses 221 installed at the site (S3003), and transmits the acquired color data information to the site management terminal 211. The site management terminal 211 displays the received color data information on the UI of the site management terminal 211 (FS_S04).

Automatic Execution of Color Check Process

When each of the one or more printing apparatuses 221 installed at the site detects that the color check execution condition, which will be described later, is satisfied (S3004), the printing apparatus 221 executes the color check process (S3005). In the color check process, the printed chart image is sensed by the color sensor, and the resultant sensed data (the measurement data) is transmitted to the site management server 102 (P_S02). When the site management server 102 receives measurement data from each printing apparatus 221, the site management server 102 analyzes the measurement data and stores the result in the data management unit B (S3006).

Figure 31:
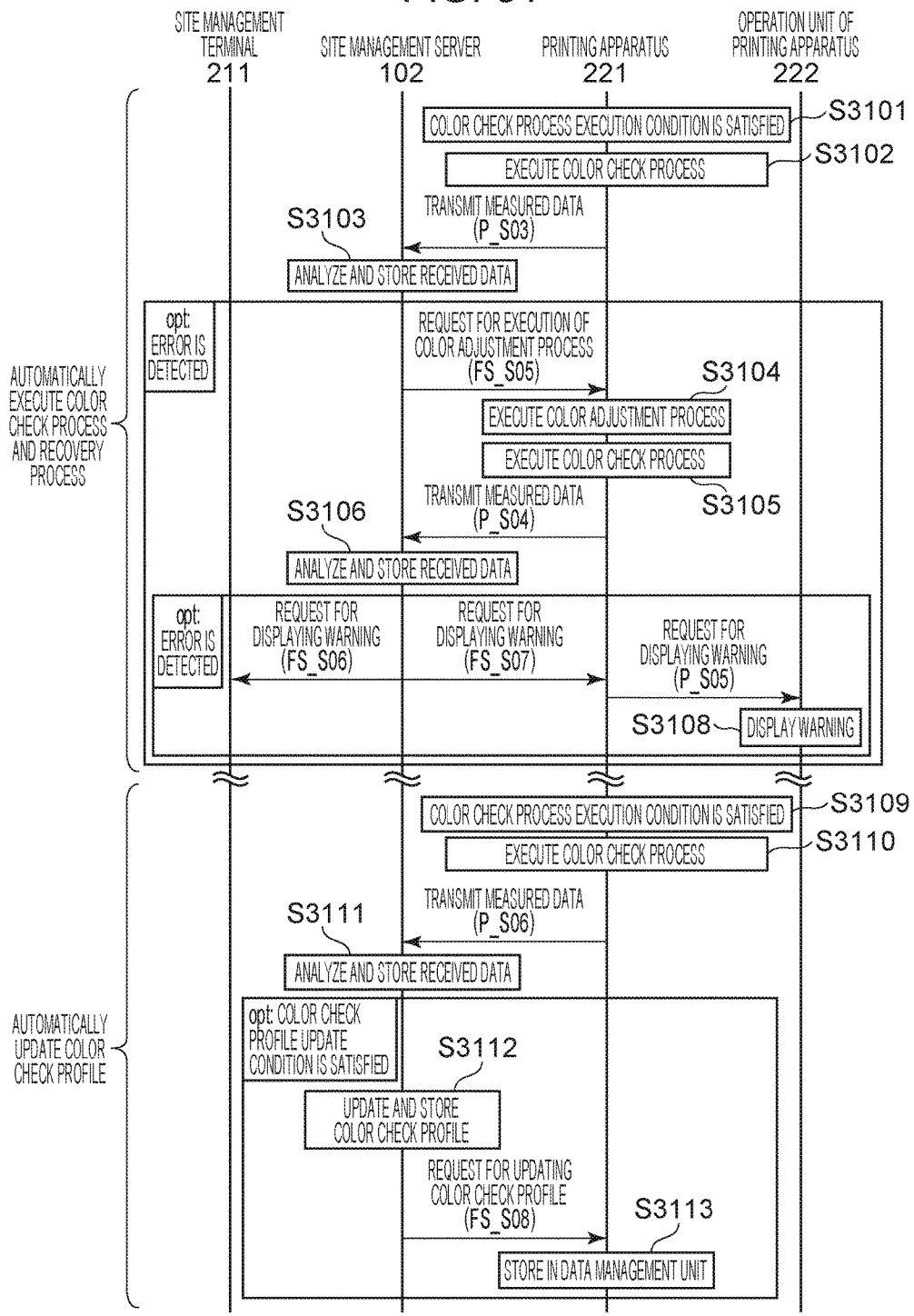
FIG. 31 is a sequence diagram illustrating a process performed in a color management system.

FIG. 31 is a sequence diagram illustrating an example of a function provided by the color management system according to the present embodiment in terms of a color check process and a function automatically executed by the system depending on a color check result.

Automatic Execution of Color Check Process and Recovery Process

The site management server 102 and the one or more printing apparatuses 221 at the site perform control processes in S3101 to S3103 in a similar manner as in the automatic execution of the color check process described above with reference to FIG. 30. The site management server 102 analyzes the measurement data obtained by reading, by the color sensor, the chart image printed when the color check is executed, and the site management server 102 stores the result in the data management unit B. In a case where the analysis on the measurement data indicates that the color value (the color state) of the image printed by the printing apparatus 221 of interest is not proper (the color value does not satisfy the required color quality criterion), the site management server 102 issues a color adjustment execution request to the printing apparatus 221 (FS_S05). In response to receiving the request, the printing apparatus 221 executes the color adjustment process (S3104). Furthermore, after the color adjustment process is completed, the printing apparatus 221 again executes the color check process (S3105), and the printing apparatus 221 transmits to the site management server 102 measurement data of the chart image sensed by the color sensor (P_S04). The site management server 102 again analyzes the received measurement data and stores the result in the data management unit B (S3106). In a case where the result of the analysis on the measured data still indicates that the color state of the printing apparatus 221 is not proper, the site management server 102 transmits a warning display request to the site management terminal 211 and the printing apparatus 221 (FS_S06, FS_S07). In response to the received warning display request, the printing apparatus 221 displays a warning on the operator terminal 222 of the printing apparatus 221 (S3108). The control processing flow associated with the site management server and the printing apparatus will be described in further detail later.

Automatic Updating of Color Check Profile

The site management server 102 and the one or more printing apparatuses 221 installed at the site perform control processes in S3109 to S3111 in a similar manner as in the automatic execution of the color check process described above with reference to FIG. 30. The site management server 102 analyzes the measurement data obtained by reading, by the color sensor, the chart image printed when the color check is executed, and the site management server 102 stores the result in the data management unit B. In a case where the analysis on the measurement data indicates that the condition for updating the color check profile is satisfied, the site management server 102 stores the content to be updated in the data management unit B (S3112), and transmits a request for updating the color check profile to the printing apparatus 221 (FS_S08). In accordance with the content of the received color check profile update request, the printing apparatus 221 updates the color check profile setting stored in the printing apparatus 221 and stores the result in the data management unit C (S3113).

Functions other than the functions described above with reference to the sequence diagram are explained.

Setting Operation Information on Printing Apparatus in Terms of Color Management Control The site management server 102 transmits color management control operation information to the printing apparatuses 221 installed at the print site 121 managed by the site management server 102. The color management control operation information is information necessary in executing the color check process and the color adjustment process.

The color check process operation information is, for example, information indicating a condition for executing the color check process on the printing apparatus 221, information indicating the criterion for judging whether the color check process result is good or not (the threshold value in terms of the difference between the colorimetric value and the target value), or the like. The color check process operation information also includes information indicating the recovery process to be performed by the printing apparatus 221 when the color check result is not good (when it is judged that the check result does not satisfy the criterion).

Examples of the color adjustment operation information include information indicating the patch configuration of the adjustment chart, information indicating a color measurement device, information indicating the chart printing condition, etc.

Check/Adjust Process by Printing Apparatus 221

When the condition to execute the color check process specified in the operation information is satisfied, the color check process is executed. Depending on a result of the color check process, a recovery process such as a color adjustment process is further executed. This process will be described in further detail later.

The color check process and the color adjustment process are executed not only when the operation execution condition received from the site management server 102 is satisfied, but the color check process and the color adjustment process may be executed in other situations.

In a case where an instruction to execute the color check process or the color adjustment process is issued by a color expert via the UI screen of the site management terminal 211, the site management terminal 211 transmits the execution instruction to the printing apparatus 221 via the site management server 102. In response to receiving the execution instruction, the printing apparatus 221 executes a specified process.

In a case where the operator terminal 222 accepts an instruction to execute the process from an operator, the printing apparatus 221 executes the specified process according to the execution instruction.

Collecting Information Associated with Printing Apparatus 221 by Site Management Server 102

The site management server 102 collects various kinds of information from the printing apparatus 221 installed at the print site 121 that the site management server 102 manages.

Examples of information associated with the printing apparatus 221 include color data information, information indicating a history of color check process execution, and information indicating an execution result. The site management server 102 also acquires color adjustment process execution history information as color adjustment process information. In addition, information indicating part consumption, information indicating states of devices, and/or the like are also acquired.

Information Collection and Analysis at Site Management Server 102

The site management server 102 processes the information acquired from the printing apparatus 221 and generates data capable of being displayed on the UI screen of the site management terminal 211. A color expert accesses the site management server 102 from the site management terminal 211 to view the information associated with the printing apparatus 221 on the UI screen of the site management application. By referring to the information displayed on the UI screen of the site management application, the color expert can understand, in an integrated manner, color management states of a plurality of printing apparatuses 221 operating at the print site 121.

Collecting Information by Centralized Management Server 101

The site management server 102 transmits information associated with the print site 121 to the centralized management server 101. The print site information includes color data information obtained from the information collected from the printing apparatuses 221 at the print site 121, information indicating the utilization factors of the printing apparatuses 221, etc.

A manager responsible for centralized management accesses the centralized management server 101 from the centralized management terminal 111 and views the print site information on the UI screen of the centralized management application. By referring to the information displayed on the UI screen of the site management application, the manager responsible for centralized management checks whether the color management operation is performed properly at each print site 121. The manager responsible for centralized management checks the information associated with the printing apparatuses 221 at respective print sites 121 in a centralized manner.

Information Database

Figure 9:
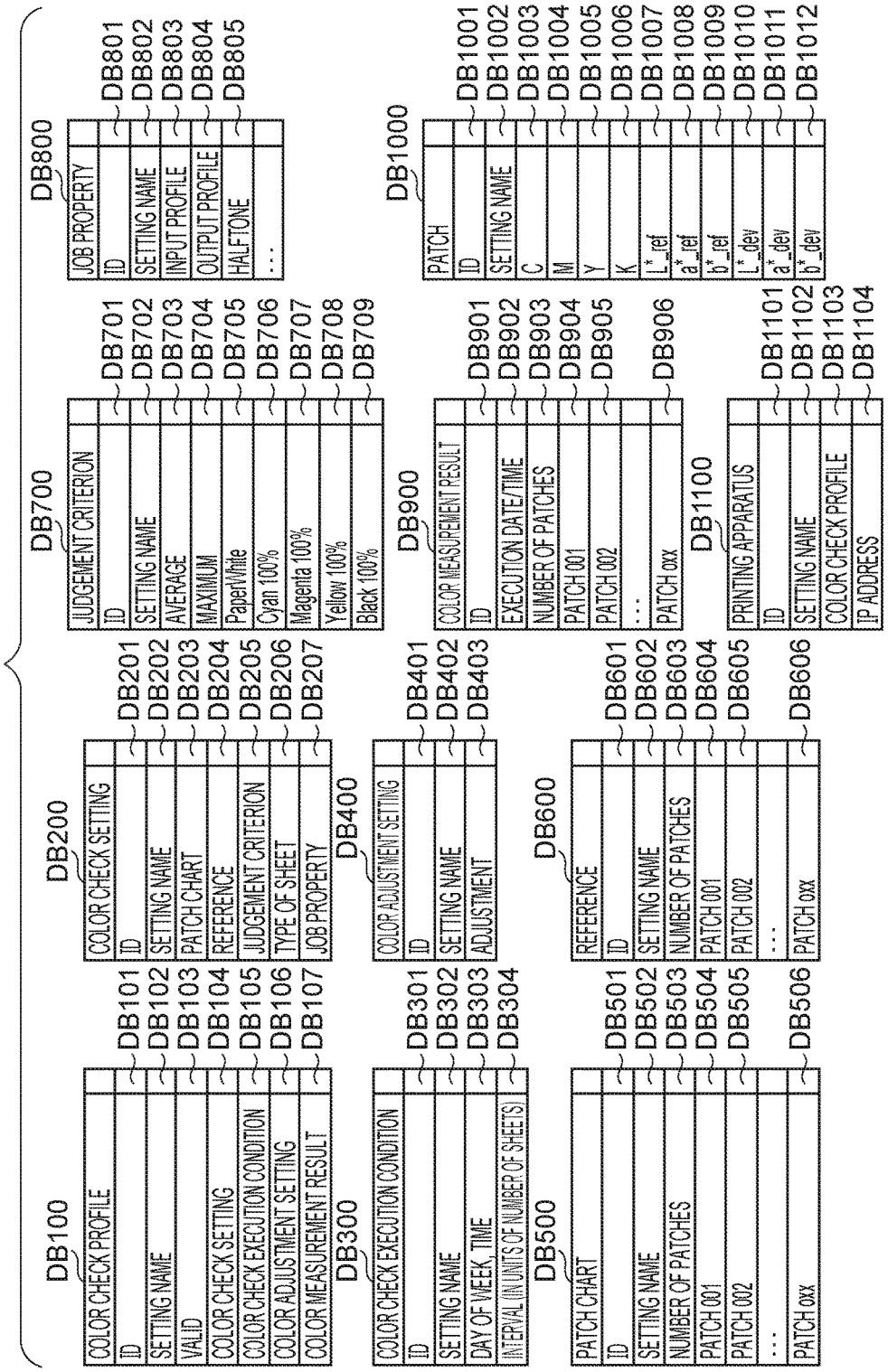
FIG. 9 is a diagram illustrating database information according to an embodiment.

Next, the information database possessed by the color management system according to the present embodiment is described in detail with reference to FIG. 9. This database is stored in the data management unit B704 of the site management server 102. As required, various control units transmit and receives information and updates data in cooperation with the centralized management server 101, the site management terminal 211, and the printing apparatus 221. Note that storage location of the database is not limited to the data management unit B 704, but alternatively the database may be stored in the data management unit A 603 of the centralized management server 101, or the data management unit C 806 of the printer controller 500 in the printing apparatus 221.

DB100 denotes a color check profile DB in which information to be set in performing a color management operation is described. The color check profile DB (DB100) includes a record in which a color check profile ID (DB101) identifying stored information is stored, a record in which setting name (DB102) to be displayed on a UI described later is stored, and further following records. A record DB103 describes information indicating whether a color management operation set by a color check profile is valid. A record DB104 describes link information indicating a link to a color check setting DB (DB200) described later. A record DB105 describes link information indicating a link to a color management execution condition DB (DB300) described later. A record DB106 describes link information indicating a link to a color adjustment setting DB (DB400) described later. A record DB107 describes link information indicating a link to a color measurement result DB (DB900) described later.

DB200 denotes a color check setting DB describing information to be set in performing a color check operation. The color check setting DB (DB200) includes a record DB201 describing a color check setting ID identifying information stored in this database, a record DB202 describing a setting name to be displayed on the UI described later, and also following records. A record DB203 describes link information indicating a link to a patch chart DB (DB500) described later. A record DB204 describes link information indicating a link to a reference (target value) DB (DB600) described later. A record DB205 describes link information indicating a link to a judgment criterion (threshold value) DB (DB700) described later. A record DB206 describes sheet information specifying a sheet to be used in executing the color check process. A record DB207 describes link information indicating a link to a job property DB (DB800) described later.

DB300 denotes a color check execution condition DB describing execution condition information to be set in performing the color check operation. The color check execution condition DB (DB300) includes a record (DB301) describing a color check execution condition ID identifying information stored in this database, a record DB302 describing a setting name to be displayed on the UI described later, and also following records. A record DB303 describes day of week and time at which the color check operation set in the color check setting DB200 is to be executed, that is, one of conditions to execute the color check operation is described in this record. A record DB304 describes an interval in units of the number of sheets at which the color check operation is to be executed, that is, one of conditions to execute the color check operation is described in this record.

DB400 denotes a color adjustment setting DB describing information to be set in performing a color adjustment operation. The color adjustment setting DB (DB400) includes a record DB401 describing a color adjustment setting ID identifying information stored in this database, a record DB402 describing a setting name to be displayed on the UI described later, and also following records. A record DB403 describes information relating to the color adjustment operation. More specifically, the information stored in this record indicates a recovery process to be executed when the result of the color check operation indicates that the color adjustment operation is necessary. The recovery process is, for example, a calibration process or a profile generation process. Note the number of color adjustment operations described in this DB is not limited to one, but a plurality of adjustment operations may be stored. In this case, information indicating the order of executing the plurality of adjustment operations may also be stored.

DB500 denotes a patch chart DB describing information to be set in performing the color check operation. More specifically, the information stored in this database indicates patch data used in printing a chart image used in the color check operation. The patch chart DB (DB500) includes a record DB501 describing a patch chart ID identifying information stored in this database, a record DB502 describing a setting name to be displayed on the UI described later, and also following records. A record DB503 describes information indicating the number of patches to be printed on a patch chart. Records DB504 to DB506 describe link information indicating a link to a patch DB (DB1000) described later. As many patch DBs are generated and stored as the number of patches specified in the record DB503.

DB600 denotes a reference DB describing information to be set in performing the color check operation. The information stored in this database describes a target value in each patch corresponding to the patch chart information specified in the patch chart DB (DB500). The reference DB (DB600) includes a record DB601 describing a reference ID identifying information stored in this database, a record DB602 describing a setting name to be displayed on the UI described later, and also following records. A record DB603 describes information indicating the number of patches to be printed on the patch chart. Records DB604 to DB606 describe link information indicating a link to a patch DB (DB1000) described later. As many patch DBs are generated and stored as the number of patches specified in the record DB603.

DB700 denotes a judgment criterion DB describing information to be set in performing the color check operation. The information described in the judgment criterion DB includes judgment items to be judged in the color check operation in terms of whether the color quality is satisfied based on the difference between the color measurement result and the target value, and also includes threshold values in the judgment of the respective items.

The judgment criterion DB (DB700) includes a record DB701 describing a judgment criterion ID identifying information stored in this database, a record DB702 describing a setting name to be displayed on the UI described later, and also following records. A record DB703 describes an average value of differences taken over all patches. A record DB704 describes a maximum value of the differences in all patches. A record DB705 describes a value of a patch representing white. Records DB706 to DB709 respectively describe values of patches of single colors of cyan, magenta, yellow, and black. The judgment criterions used in the present embodiment are defined for items described in DB703 to DB709. However, the items are not limited to those. Only part of these items may be employed, and/or other different items may be combined with part or all of these items.

DB800 denotes a job property DB describing information to be set in performing the color check operation. The information described in this job property DB indicates print setting in items of a patch chart to be printed in the color check operation. The job property DB (DB800) includes a record (DB801) describing a job property ID identifying the information stored in this database, a record DB802 describing a setting name to be displayed on the UI described later, and also following records. Note that the items described in DB803 and elsewhere includes items defining setting necessary in performing a print job to print a patch chart by the printing apparatus 221. The record DB803 describes an input color profile. A record DB804 describes an output color profile. A record DB805 describes information relating to halftone. Items described in this database are not limited to those described above, but other items to be set by the print control unit 802 in the printing apparatus 221 may be described. Note that the items are variable depending on the printing apparatus 221.

DB900 denotes a color measurement result DB describing information indicating a color measurement result in the color check operation. That is, the information described in this database indicates a colorimetric value of a patch printed by the printing apparatus 221 and subjected to the color measurement. The color measurement result DB (DB900) includes a record DB501 describing a color measurement result ID identifying information stored in this database, and following records. A record DB902 describes information indicating an execution date/time when the color check operation was executed. A record DB903 describes information indicating the number of patches to be printed on a patch chart. Records DB904 to DB906 describe link information indicating a link to a patch DB (DB1000) described later. As many patch DBs are generated and stored as the number of patches specified in the record DB903.

DB1000 denotes a patch DB describing information to be set in performing the color check operation. The information described in this database indicates patches forming a chart. The patch DB (DB1000) includes a record DB1001 describing a patch ID identifying information stored in this database, a record DB1002 describing a setting name to be displayed on the UI described later, and also following records. Records DB1003 to DB1006 describe input signal information of patches, respectively corresponding to cyan, magenta, yellow, and black.

Records DB1007 to DB1009 describe information relating to target values or references described in DB600. In the present embodiment, the color data information indicating target values are represented in a CIE_L*a*b* color space in a widely employed manner. However, the color data information may be represented in any alternative form as long as it can be used in the color check operation. For example, the color data information may be represented in a CIE_XYZ color space or may be represented as density information.

Records DB1010 to DB1012 describe information relating to color measurement results described above with reference to DB900. In the present embodiment, as with the records DB1007 to DB1009, the information is represented in the CIE_L*a*b* space, although the information may be represented in an alternatively form. However, from the point of view of calculating differences, it may be desirable to store color measurement result information in the same form as the form in which target values are described.

DB1100 denotes a printing apparatus DB describing information associated with the printing apparatus 221 to be subjected to color management by a color expert using a site management application. The printing apparatus DB (DB1100) includes a record DB1101 describing a printing apparatus ID identifying information stored in this database, a record DB1102 describing a setting name to be displayed on the UI described later, and also following records. A record DB1103 describe link information indicating a link to the color check profile DB (DB100). A record DB1104 describes information indicating an IP address of the printing apparatus 221. Note that the information described in the record DB1104 is not limited to the IP address, but the information may be described in another manner as long as it can identify the printing apparatus 221.

Site Management Application UI

Next, the site management application used in achieving the color management system according to the present embodiment is described in detail with reference to FIGS. 10 to 22. As described above, the site management application deals with various kinds of information necessary in managing printing apparatuses by a color expert. However, the following discussion will focus on functions relating to the color management. The UI screens described below are all generated and controlled by the site management application execution unit 722 and displayed on a display unit (not illustrated) via the UI control unit B 723. Furthermore, an instruction issued by a color expert is accepted via this UI and an operation unit (not illustrated).

Figure 10:
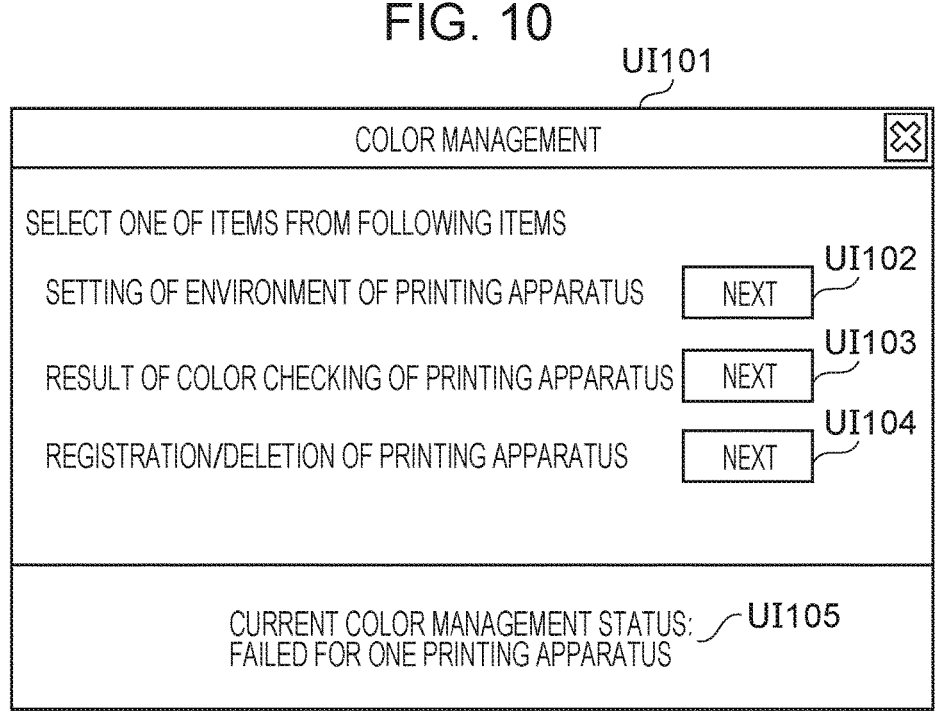
FIG. 10 is a diagram illustrating an example of a site management application UI screen.

In FIG. 10, UI101 denotes an example of a top screen of the site management application according to the present embodiment.

On this UI101, if a color expert presses one of buttons, a button UI102 for setting various environmental parameters used in performing color management, a button UI103 for checking a color management result, and a button UI104 for registering or deleting devices subjected to color management, then a next screen appears depending on the pressed button. A message UI105 gives information to the color expert as to whether a problem occurs in any printing apparatus 221 under the management.

More specifically, for example, in a latest color check according to a color check profile applied to all printing apparatuses 221 managed by the color expert, if any one of the printing apparatuses 221 fails to pass the check, the message UI105 displays information indicating this fact. Note that the information given by the message UI105 is not limited to the example described above, but any other information useful for the color expert, which may be stored in the data management unit B 704, may be displayed.

Figure 11:
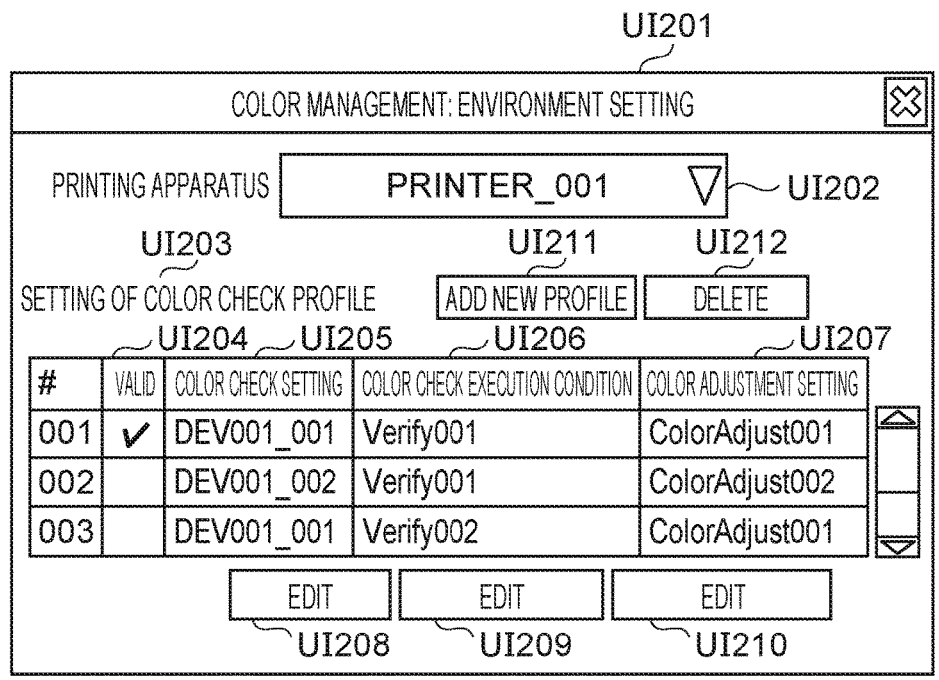
FIG. 11 is a diagram illustrating an example of a site management application UI screen.

In FIG. 11, UI201 denotes an example of a screen for setting an environment of the color management application. When the environment setting button UI102 on the screen UI101 is pressed, the environment setting screen UI201 is generated by the site management application execution unit 722 and displayed on a display unit (not illustrated) via the UI control unit B 723.

UI202 denotes a selection box indicating a printing apparatus 221 for which the environment setting is to be performed. The site management application execution unit 722 requests the data management unit B 704 to provide information (DB1100) indicating printing apparatuses 221 registered by the color expert, and the site management application execution unit 722 displays acquired information.

UI203 selectively indicates setting information as to the color check profile setting. If the printing apparatus 221 is selected in the selection box UI202, the site management application execution unit 722 accesses the color check profile database DB100 in the data management unit B704 to acquire a color check profile assigned to the printing apparatus 221 specified in the printing apparatus database DB1100, and displays the acquired information on the UI203.

UI204 indicates a valid item (DB103) in the color check profile database DB100. If the item in the color check profile is valid, this fact is indicated. UI205 to UI207 respectively indicate the setting names described in DB104 to DB106. When a color expert selects a desired one of rows of the color check profile in UI203, it becomes possible to change the setting of the selected color check profile. UI208 is a button to open a screen for the color check setting which will be described later. UI209 is a button to open a screen for the color check execution setting which will be described later. UI210 is a button to open a screen for the color adjustment execution setting which will be described later.

UI211 is a button for adding new color check profile setting. If the add button UI211 is pressed, the site management application execution unit 722 generates a new color check profile DB100 and displays the generated color check profile on the UI203. More specifically, the site management application execution unit 722 transmits information associated with the color check profile DB100 to be newly generated to the site management server 102, and the information associated with the newly generated color check profile DB100 is stored in the data management unit B704. UI212 is a button to delete the color check profile setting. When a color check profile is selected, if the button UI212 is pressed, the site management application execution unit 722 transmits a delete request to the site management server 102. In response to the delete request, the site management server 102 deletes the selected color check profile DB100 from the data management unit B704 and also deletes the associated information displayed on the UI203.

Figure 12:
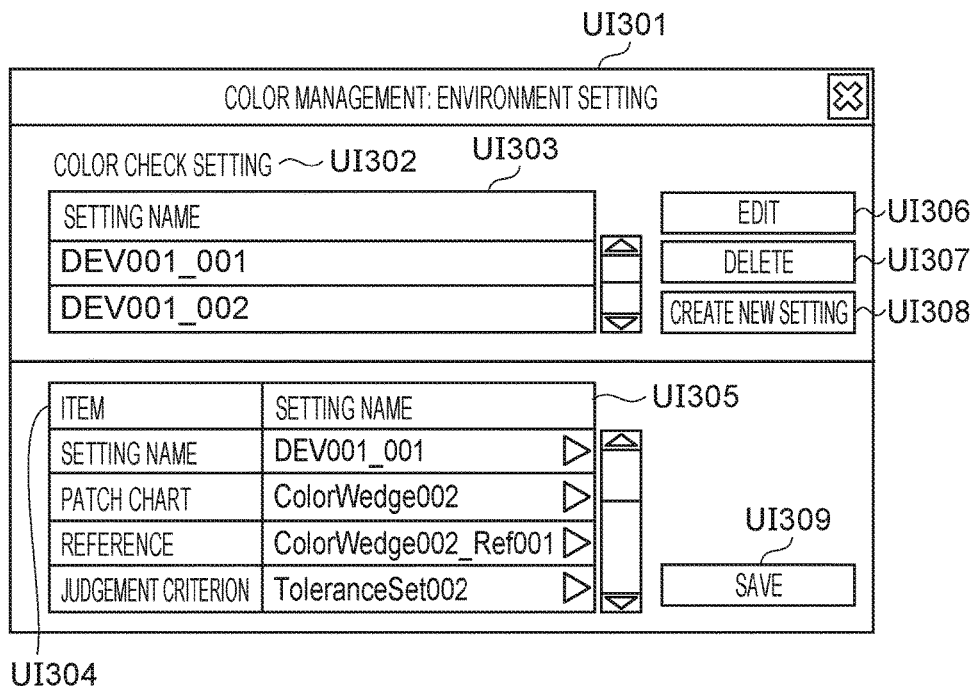
FIG. 12 is a diagram illustrating an example of a site management application UI screen.

In FIG. 12, UI301 denotes an example of a color check setting edit UI screen in the environment setting of the site management application. If the edit button UI208 on the color check setting screen UI201, the site management application execution unit 722 generates the color check setting edit screen UI301 and displays it on the display unit (not illustrated) via the UI control unit B723.

In UI302, a list of color check settings associated with the printing apparatus 221 selected in UI202 is displayed. The site management application execution unit 722 accesses the data management unit B704 to acquire color check setting information and displays the acquired color check setting information. UI303 indicates setting names (DB202) of the acquired color check settings DB200.

If one of color check settings in UI303 is selected by a color expert, the site management application execution unit 722 accesses the data management unit B704 to acquire detailed information of the selected color management setting. The site management application execution unit 722 displays the acquired detailed information in UI304 and UI305. More specifically, information described in DB203 to DB207 of the color check database DB200 are displayed as items and setting names in UI304 and UI305.

In a patch chart field, a setting name described in DB502 of the patch chart database DB500 is displayed. In a reference field, a setting name described in DB602 of the reference database DB600 is displayed. In a judgment criterion field, a setting name described in DB702 of the judgment criterion database DB700 is displayed. In a job property field, a setting name described in DB802 of the job property database DB800 is displayed.

UI306 denotes a button for editing the color check setting. If the edit button UI306 is pressed, it becomes possible to edit contents of the items. The editing of the contents of the items will be described in detail later. After the setting or editing by the color expert is completed, if a save button UI309 is pressed, the site management application execution unit 722 transmits the edited information to the site management server 102. In response, the data management unit B704 updates the registered information.

UI307 denotes a button for deleting the color check setting. If the delete button UI307 is pressed by a color expert, the site management application execution unit 722 transmits a delete request to the site management server 102. In response, the site management server 102 deletes the information associated with the color check setting selected on UI303 from the data management unit B704 and also deletes the associated information displayed on UI303.

UI308 denotes a button for creating a new color check setting. If the create button UI308 is pressed by a color expert, the site management application execution unit 722 generates a new color check setting DB200 and displays it on UI305. More specifically, the site management application execution unit 722 transmits information associated with the color check setting DB200 to be newly created to the site management server 102, and the information associated with the newly created color check setting DB200 is stored in the data management unit B704.

Figure 13:
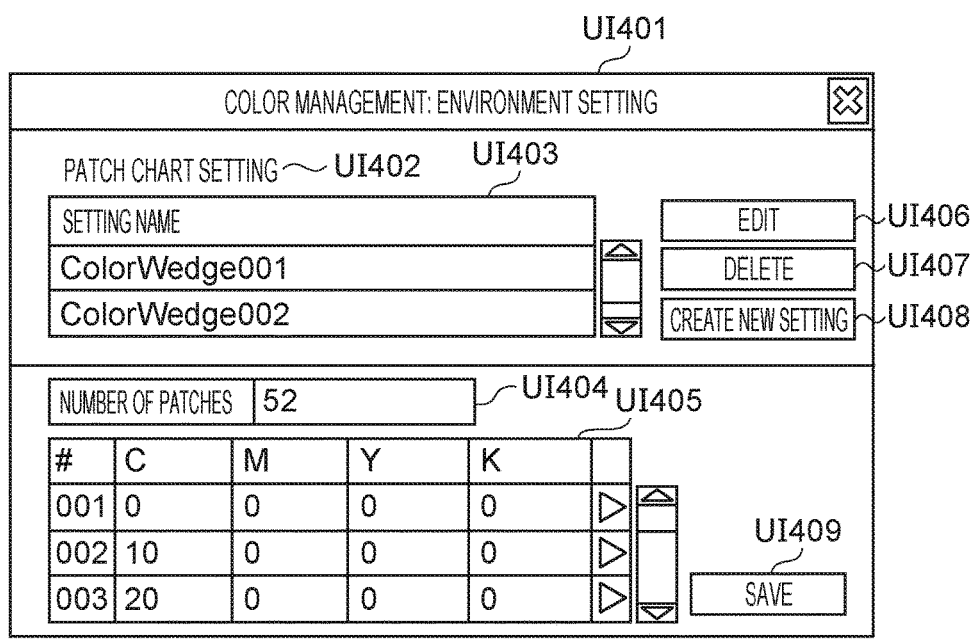
FIG. 13 is a diagram illustrating an example of a site management application UI screen.

In FIG. 13, UI401 denotes an example of a patch chart edit UI screen in the environment setting of the site management application. When the edit button for editing the patch chart item in the color check setting on UI301 is pressed, the site management application execution unit 722 generates the patch chart edit screen UI401 and displays it on the display unit (not illustrated) via the UI control unit B723.

In UI402, a list of patch chart settings associated with the printing apparatus 221 selected in UI202 is displayed. The site management application execution unit 722 requests the data management unit B704 to provide the patch chart setting information, and the site management application execution unit 722 displays the acquired patch chart setting information. In UI403, setting names (DB502) of the acquired patch chart DB500 are displayed.

If one of the patch chart settings in UI403 is selected by a color expert, the site management application execution unit 722 requests the data management unit B704 to provide detailed information of the selected patch chart setting. The acquired detailed information of the patch chart setting is displayed in UI404 and UI405. More specifically, information stored in DB503 to DB506 of the patch chart database DB500 is acquired and displayed as items and the setting name in UI404 and UI405.

In UI404, the number of patches stored in DB503 is displayed. In UI405, input signal values of the patches stored in DB504 to DB506 are displayed. The values in UI405 are displayed in as many rows as the number of patches displayed in UI404. For example, detailed information associated with the patch 001 (DB504) is stored in the patch database DB1000 pointed to by link information described in DB504, and input signal values described there (DB1003 to DB1006) are displayed. UI406 to UI409 respectively denote buttons for editing, deleting, newly creating, and saving a patch chart setting. These buttons operate on the patch chart database DB500 in a similar manner as the above-described buttons UI306 to UI309 on the color check setting screen UI301, and thus a further description thereof is omitted.

Figure 14:
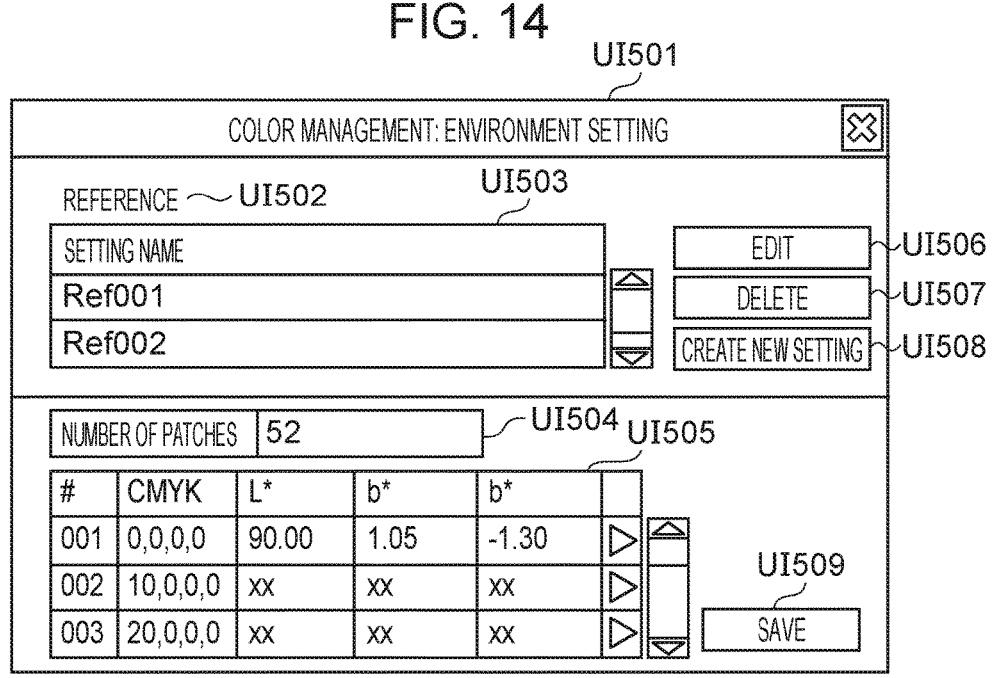
FIG. 14 is a diagram illustrating an example of a site management application UI screen.

In FIG. 14, UI501 denotes an example of a reference edit UI screen in the environment setting of the site management application. When the edit button for editing the reference item in the color check setting on UI301 is pressed, the site management application execution unit 722 generates the reference edit screen UI501 and displays it on the display unit (not illustrated) via the UI control unit B723.

In UI502, a list of reference settings associated with the printing apparatus 221 selected in UI202 is displayed. The site management application execution unit 722 accesses the data management unit B704 to acquire the reference setting information, and the site management application execution unit 722 displays acquired information. In UI503, setting names (DB602) of the acquired references DB600 are displayed.

If one of the reference settings in UI503 is selected by a color expert, the site management application execution unit 722 accesses the data management unit B704 to acquire detailed information of the selected reference setting. The acquired detailed information of the reference setting is displayed in UI504 and UI505. More specifically, information stored in DB603 to DB606 of the reference database DB600 is acquired and displayed as items and the setting name in UI504 and UI505.

In UI504, the number of patches stored in DB603 is displayed. In UI505, input signal values of the patches stored in DB604 to DB606 are displayed. The values in UI505 are displayed in as many rows as the number of patches displayed in UI504. For example, detailed information associated with the patch 001 (DB504) is stored in the patch database DB1000 pointed to by link information described in DB604, and input signal values stored there (DB1003 to DB1006) and target values (DB1007 to DB1009) are displayed.

UI506 to UI509 respectively denote buttons for editing, deleting, newly creating, and saving a patch chart setting. These buttons operate on the reference database DB600 in a similar manner as the above-described buttons UI306 to UI309 on the color check setting screen UI301, and thus a further description thereof is omitted.

Figure 15:
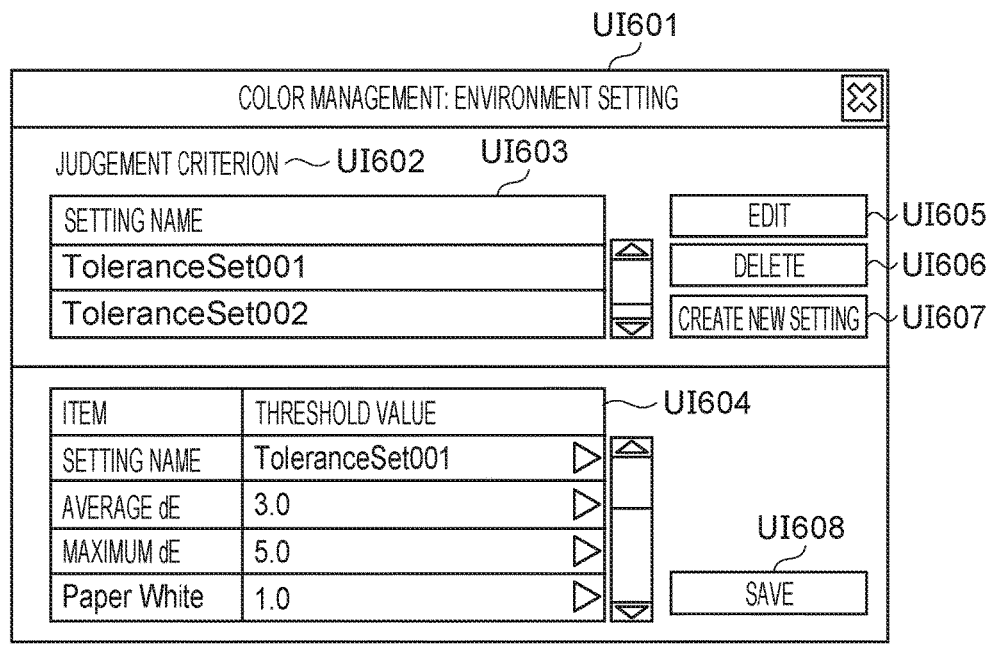
FIG. 15 is a diagram illustrating an example of a site management application UI screen.

In FIG. 15, UI601 denotes an example of a judgment criterion edit UI screen in the environment setting of the site management application. When the edit button for editing a judgment criterion item in the color check setting on UI301 is pressed, the site management application execution unit 722 generates the judgment criterion edit screen UI601 and displays it on the display unit (not illustrated) via the UI control unit B723.

In UI602, a list of judgment criterion settings associated with the printing apparatus 221 selected in UI202 is displayed. The site management application execution unit 722 accesses the data management unit B704 to acquire judgment criterion setting information, and the site management application execution unit 722 displays acquired information. In UI603, setting names described in DB702 of the judgment criterion database DB700 are displayed.

If one of judgment criterion settings in UI603 is selected by a color expert, the site management application execution unit 722 accesses the data management unit B704 to acquire detailed information of the selected judgment criterion setting, and displays the acquired information in UI604. More specifically, information stored in DB703 to DB709 of the judgment criterion database DB700 is acquired and displayed as items and the setting name in UI604.

UI605 to UI608 respectively denote buttons for editing, deleting, newly creating, and saving a judgment criterion setting. These buttons operate on the judgment criterion database DB700 in a similar manner as the above-described buttons UI306 to UI309 on the color check setting screen UI301, and thus a further description thereof is omitted.

Figure 16:
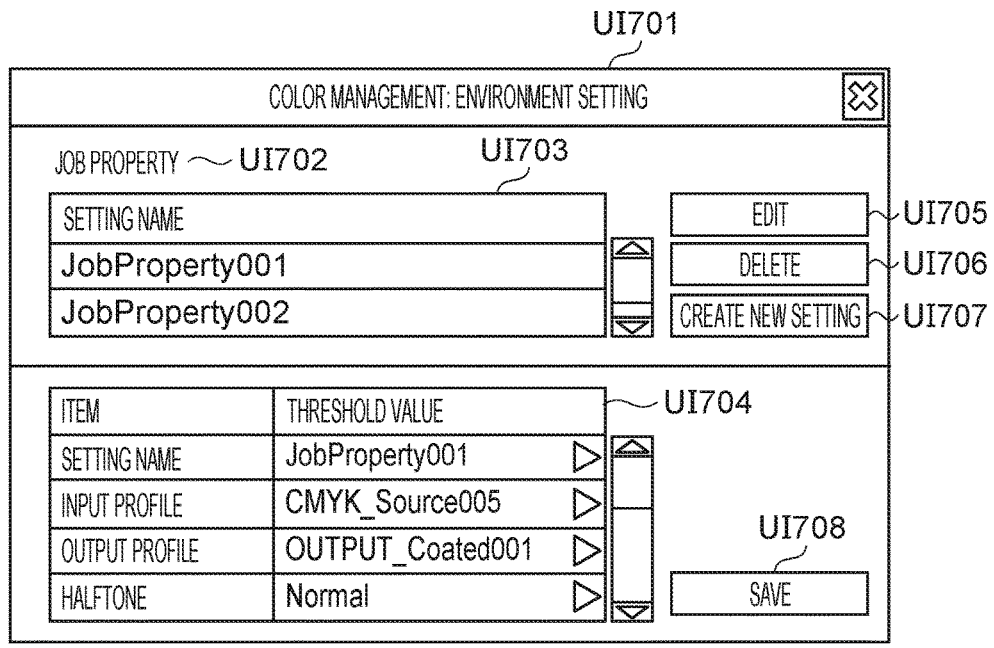
FIG. 16 is a diagram illustrating an example of a site management application UI screen.

In FIG. 16, UI701 denotes an example of a job property edit UI screen in the environment setting of the site management application. When the edit button for editing a job property item in the color check setting on UI301 is pressed, the site management application execution unit 722 generates the job property edit screen UI701 and displays it on the display unit (not illustrated) via the UI control unit B723.

In UI702, a list of job property settings associated with the printing apparatus 221 selected in UI202 is displayed. The site management application execution unit 722 accesses the data management unit B704 to acquire job property setting information and the site management application execution unit 722 displays acquired information. In UI703, acquired setting names described in DB802 of the job property database DB800 are displayed.

If one of the job property settings in UI703 is selected by a color expert, the site management application execution unit 722 accesses the data management unit B704 to acquire detailed information of the selected job property setting, and the site management application execution unit 722 displays the acquired detailed information in UI704. More specifically, information stored in DB803 to DB805 of the job property database DB800 is acquired and displayed as items and the setting name in UI704.

UI705 to UI708 respectively denote buttons for editing, deleting, newly creating, and saving a job property setting. These buttons operate on the job property database DB800 in a similar manner as the above-described buttons UI306 to UI309 on the color check setting screen UI301, and thus a further description thereof is omitted.

Figure 17:
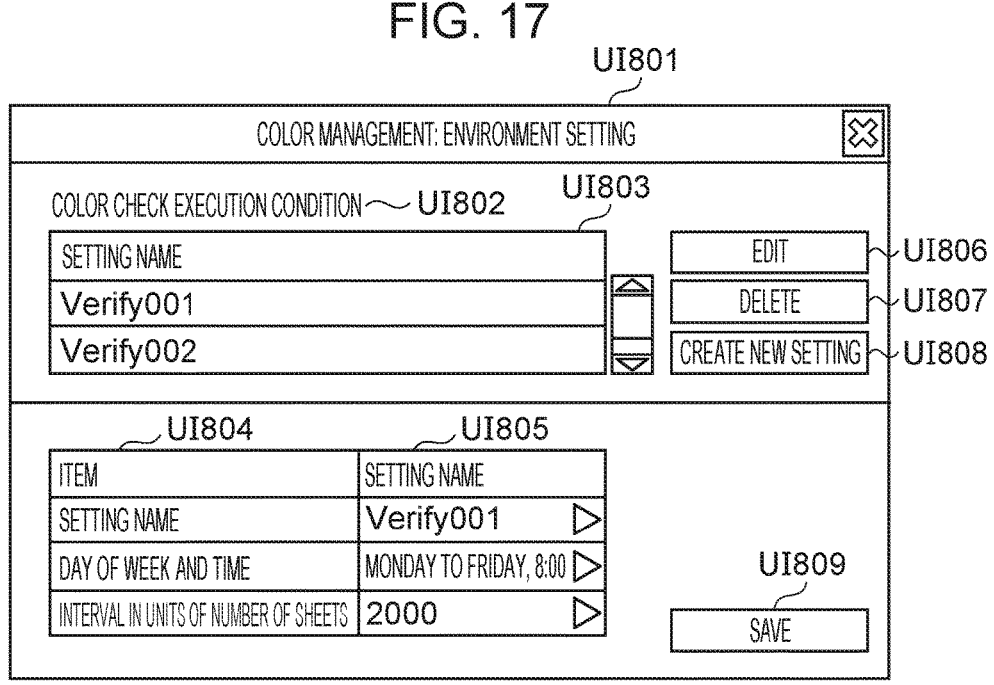
FIG. 17 is a diagram illustrating an example of a site management application UI screen.

In FIG. 17, UI801 denotes an example of a color check execution condition edit UI screen in the environment setting of the site management application. If the color check execution condition edit button UI209 on UI201 is pressed, the site management application execution unit 722 generates the color check execution condition edit screen UI801 and displays it on the display unit (not illustrated) via the UI control unit B723.

In UI802, a list of color check execution conditions is displayed. The site management application execution unit 722 accesses the data management unit B704 to acquire color check execution condition information and the site management application execution unit 722 displays acquired information. In UI803, acquired setting names (DB302) of the color check execution condition database DB300 is displayed.

If one of color check execution conditions in UI803 is selected by a color expert, the site management application execution unit 722 accesses the data management unit B704 to acquire detailed information of the selected color check execution condition, and the site management application execution unit 722 displays the acquired detailed information in UI804 and UI805. More specifically, information stored in DB302 to DB304 of the color check execution condition database DB300 is acquired and displayed as items and the setting name in UI804 and UI805.

UI806 to UI809 respectively denote buttons for editing, deleting, newly creating, and saving a color check execution condition. These buttons operate on the color check execution condition database DB300 in a similar manner as the above-described buttons UI306 to UI309 on the color check setting screen UI301, and thus a further description thereof is omitted.

Figure 18:
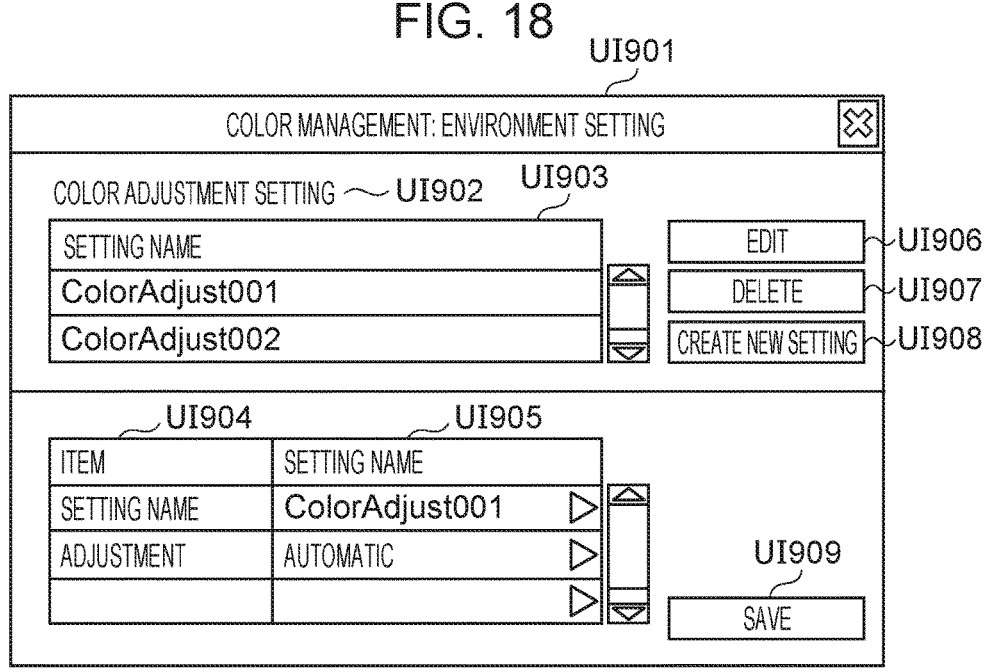
FIG. 18 is a diagram illustrating an example of a site management application UI screen.

In FIG. 18, UI901 denotes an example of a color adjustment setting edit UI screen in the environment setting of the site management application. If the color adjustment setting edit button UI906 on UI201, the site management application execution unit 722 generates the color adjustment setting edit screen UI901 and displays it on the display unit (not illustrated) via the UI control unit B 723.

In UI902, a list of color adjustment settings is displayed. The site management application execution unit 722 accesses the data management unit B704 to acquire the color adjustment setting information, and the site management application execution unit 722 displays acquired information. In UI903, acquires setting names (DB402) of the color adjustment setting database DB400 are displayed.

If one of color adjustment settings in UI903 is selected by a color expert, the site management application execution unit 722 accesses the data management unit B 704 to acquire detailed information of the selected color adjustment setting, and displays the acquired detailed information in UI904 and UI905. More specifically, information stored in DB402 and DB403 of the color adjustment setting database DB400 is acquired and displayed as items and the setting name in UI904 and UI905. UI906 to UI909 respectively denote buttons for editing, deleting, newly creating, and saving a color adjustment setting. These buttons operate on the color adjustment setting database DB400 in a similar manner as the above-described buttons UI306 to UI309 on the color check setting screen UI301, and thus a further description thereof is omitted.

As described above, via screens UI201 to UI901, a color expert performs the environment setting necessary in the color management. Note that the UI screens for setting the environment and setting items thereof, and forms of the UI screens described above are merely examples, and the UI screens may be configured in any other ways as long as the purposes of the respective UI screens can be achieved. For example, the environment setting and the result displaying may be given in a single screen.

After the environment setting information associated with the color management is generated according to the instruction issued by the site management application execution unit 722 and stored in the data management unit B704, the environment setting information is transmitted to the printing apparatus 221 via the printing apparatus communication unit 703. The printer controller 500 of the printing apparatus 221 receives the environment setting information via the data transmission/reception unit C 804 and stores it in the data management unit C 806. When the color check execution condition is satisfied, the color management unit 805 executes the color check process according to the environment setting information.

After the color check process is executed, the color management unit 805 stores color measurement result information in the data management unit C 806 and also transmits the color measurement result information to the site management server 102. The site management server 102 stores the received color measurement result information in the data management unit B 704. The data management unit B 704 stores the color measurement result information received from the color management unit 805 in colorimetric values DB1010 to DB1012 of the corresponding patch DB.

Color Check Result of the Printing Apparatus 221

An example of UI screen for displaying a result of a color check process performed according to a specified environment setting is described below with reference to FIGS. 19 to 21.

Figure 19:
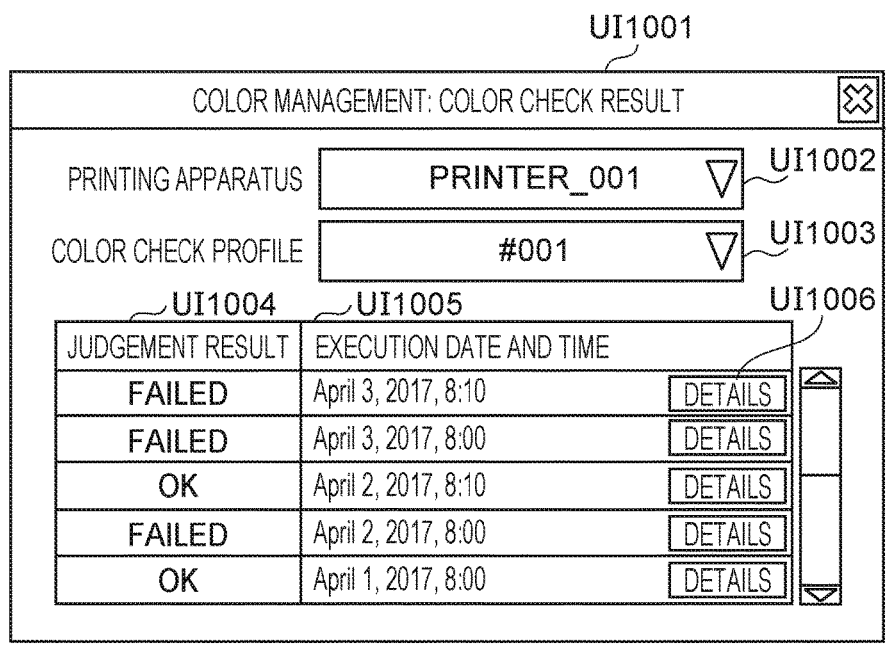
FIG. 19 is a diagram illustrating an example of a site management application UI screen.

In FIG. 19, UI1001 denotes an example of a color check result UI screen in the site management application. When the color check result button UI103 on UI101 is pressed, the site management application execution unit 722 generates the color check result screen UI1001 and displays it on the display unit (not illustrated) via the UI control unit B 723.

UI1002 denotes a selection box indicating a printing apparatus 221 for which the color check result is to be displayed. The site management application execution unit 722 accesses the data management unit B 704 to acquire information (UI1100) associated with the printing apparatus 221 registered by a color expert and the site management application execution unit 722 displays acquired information.

In UI1003, a color check profile associated with the printing apparatus 221 selected in UI1002 is selectively displayed. If the printing apparatus 221 is selected in UI1002, the site management application execution unit 722 accesses the data management unit B 704 to acquire information of the same color management profile DB. Information associated with the same color management profile as the color management profile DB for the printing apparatus 221 specified in the printing apparatus DB1100 is acquired, and the site management application execution unit 722 displays the acquired information in UI1003.

When a color expert selects a desired color check profile in UI1003, the site management application execution unit 722 accesses the data management unit B 704 to acquire detailed information of the corresponding color check result. The site management application execution unit 722 displays the acquired detailed information in UI1004 and UI1005.

In UI1004, information associated with a result of the judgment of the executed color check operation is displayed. The site management application execution unit 722 acquires information described in the color check profile DB200 from the data management unit B 704. Based on the acquired information, the difference between the colorimetric value and the target value is calculated for each patch, and the calculated difference is compared with the judgment criterion thereby determining the judgment result.

The process described above is described in further detail with reference specific examples. Information on a certain patch is stored in DB1000. More specifically, colorimetric values of the patch are stored in DB1010 to DB1012 ($L^*\_dev$, $a^*\_dev$, $b^*\_dev$), while target values are stored in DB1007 to DB1009 ($L^*\_ref$, $a^*\_ref$, $b^*\_ref$). The difference Delta_E used in the judgment for the patch is given, for example, as follows.

$$Delta\_E = ((L^*\_ref - L^*\_dev)^2 + (a^*\_ref - a^*\_dev)^2 + (b^*\_ref - b^*\_dev)^2)^{(1/2)}$$

In the example described above, the colorimetric values and the target values are represented in the CIE_$L^*a^*b^*$ space and the color difference (Delta_E) is determined in a widely employed manner. However, the difference may be calculated according to another formula. The calculated value of Delta_E is compared with a threshold value for each setting item of the judgment criterion DB700. For example, in a case where an average value is used in the judgment, the average value of Delta_E values of all patches specified in the patch chart DB500 is calculated, and the calculated average value of Delta_E is compared with the threshold value stored in the average DB703. Similarly, the measured values stored in DB1010 to DB1012 are compared with threshold values stored in DB703 to DB709 for all items set in the judgment criterion DB700. If the following condition is satisfied, then the judgment result is "OK" but otherwise this judgment item fails to pass the judgment (the judgment result is "FAILED").

measured value≤threshold value of the judgment criterion item

The site management application execution unit 722 displays, in UI1004, judgment results stored in the data management unit B 704 for all or part of color check processes performed in the past.

Furthermore, information indicating the date/time when each color check process was executed is displayed in UI1005. The site management application execution unit 722 acquires information of the color measurement result DB900 from the data management unit B 704 and displays the execution date/time information stored in DB902.

UI1006 is a detail button. When a color expert wants to get further detailed information about the judgment result, if this detail button UI1006 is pressed, the site management application execution unit 722 displays a screen UI1101 which will be described below.

In FIG. 20, UI1101 denotes an example of a color check result UI screen of the site management application. When a detail button UI1006 on UI1001 is pressed, the site management application execution unit 722 generates the color check result screen UI1101 and displays it on the display unit (not illustrated) via the UI control unit B723.

In UI1102, detailed information regarding the selected color check process result is displayed. The site management application execution unit 722 collects necessary information from the data management unit B704 and displays the collected information. In the present example, information is displayed as to the printing apparatus DB1100, the color check profile DB102, the judgment result, and the execution date/time DB902. However, the items of the information are not limited to those, but information of other items may be displayed.

In UI1103 and UI1104, detailed information on the result of the selected color check process based on the judgment criterion is displayed. The site management application execution unit 722 collects necessary information from the data management unit B704 and displays the collected information. More specifically, information obtained as a result of performing the above-described judgment process based on the judgment criterion described in each of DB703 to DB709 included in the judgment criterion DB700 is displayed. Displaying the judgment result for each judgment item makes it possible for a color expert to understand, when a printing apparatus 221 fails to pass the judgment, which one of the judgment items has failed.

UI1105 is a patch color measurement result detail button. When a color expert wants to get further detailed information on the color measurement result of each patch, if this patch color measurement result detail button UI1105 is pressed, the site management application execution unit 722 displays a screen UI1201 described below.

In FIG. 21, UI1201 denotes an example of a color check result UI screen of the site management application. When the patch color measurement result detail button UI1105 on UI1001 is pressed, the site management application execution unit 722 generates the color check result UI screen UI1201, and displays it on the display unit (not illustrated) via the UI control unit B 723.

In UI1202, detailed information regarding the selected color check process result is displayed. This information is the same as that displayed in UI1102, and thus a further description thereof is omitted.

In UI1203 and UI1204, detailed information on the result of the selected color check process based on the patch information is displayed. The site management application execution unit 722 collects necessary information from the data management unit B704 and displays the collected information. In the present example, for each patch stored in the patch chart DB used in the judgment, following values are displayed: input signal values (DB1003 to DB1006); colorimetric values (DB1010 to DB1012); reference values defined as target values (DB1007 to DB1009); and dE_L*a*b* values calculated according to the formula described above. Providing these pieces of information makes it possible for a color expert to understand the color characteristic of the printing apparatus 221, and, in a case where the judgment result is not good, to get further detailed information for analysis.

Registration and Deletion of Printing Apparatus 221

Next, a UI screen for registration and deletion of the printing apparatus 221 managed by the color management application is described below with reference to FIG. 22.

Figure 22:
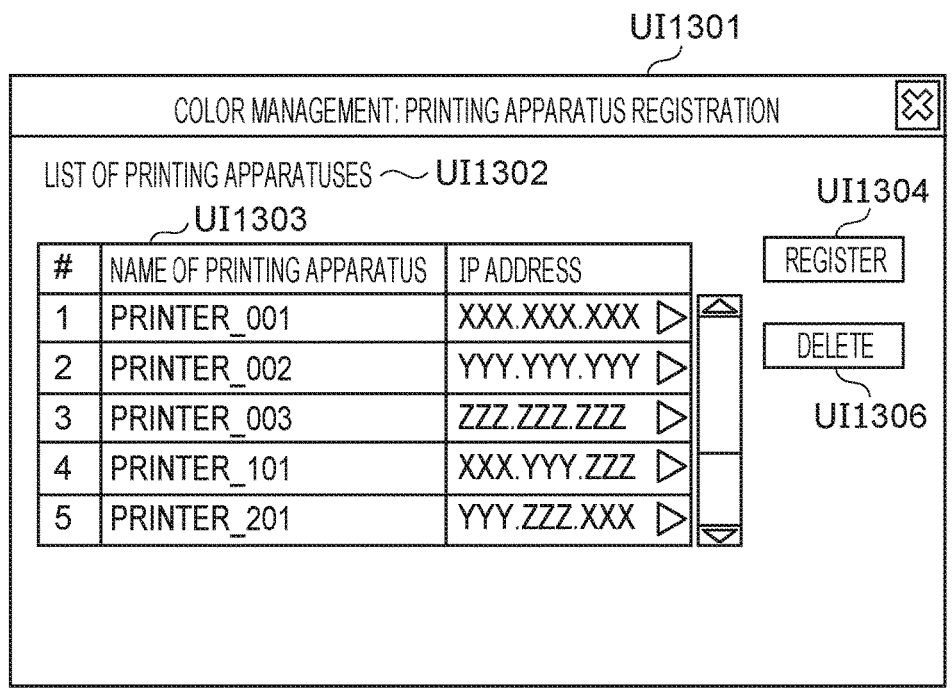
FIG. 22 is a diagram illustrating an example of a site management application UI screen.

In FIG. 22, UI1301 denotes an example of a printing apparatus registration UI screen of the site management application. When the printing apparatus registration/deletion UI104 on UI101 is pressed, the site management application execution unit 722 generates the printing apparatus registration UI screen UI1301 and displays it on the display unit (not illustrated) via the UI control unit B723.

In UI1302 and UI1303, information associated with the registered printing apparatuses 221 is displayed. The site management application execution unit 722 collects necessary information from the data management unit B704 and displays the collected information. In the present example, printing apparatus names (DB1102) and IP address information (DB1103) are displayed. However, the information displayed here is not limited to these, but other information associated with printing apparatuses 221 may be displayed.

UI1304 is a registration button. When this button is pressed by a color expert, the site management application execution unit 722 generates a new printing apparatus DB1100 and displays it in UI1303. Furthermore, the site management application execution unit 722 transmits the generated information to the site management server 102, which in turn stores the received information in the data management unit B 704.

UI1305 is a delete button. When this button is pressed by a color expert, the site management application execution unit 722 informs the site management server 102 that the information associated with a printing apparatus selected in UI1303 is to be deleted. As a result, the information associated with the selected printing apparatus is deleted from the data management unit B 704, and the information is deleted from UI1303.

In the present embodiment, the color check process is executed using the system described above. Depending on a result of analysis on the color check process, a color adjustment process and a process of providing information to a color expert or an operator (hereinafter, referred to as a user) are performed as described below with reference to flow charts shown in FIGS. 23 and 24.

Figure 23:
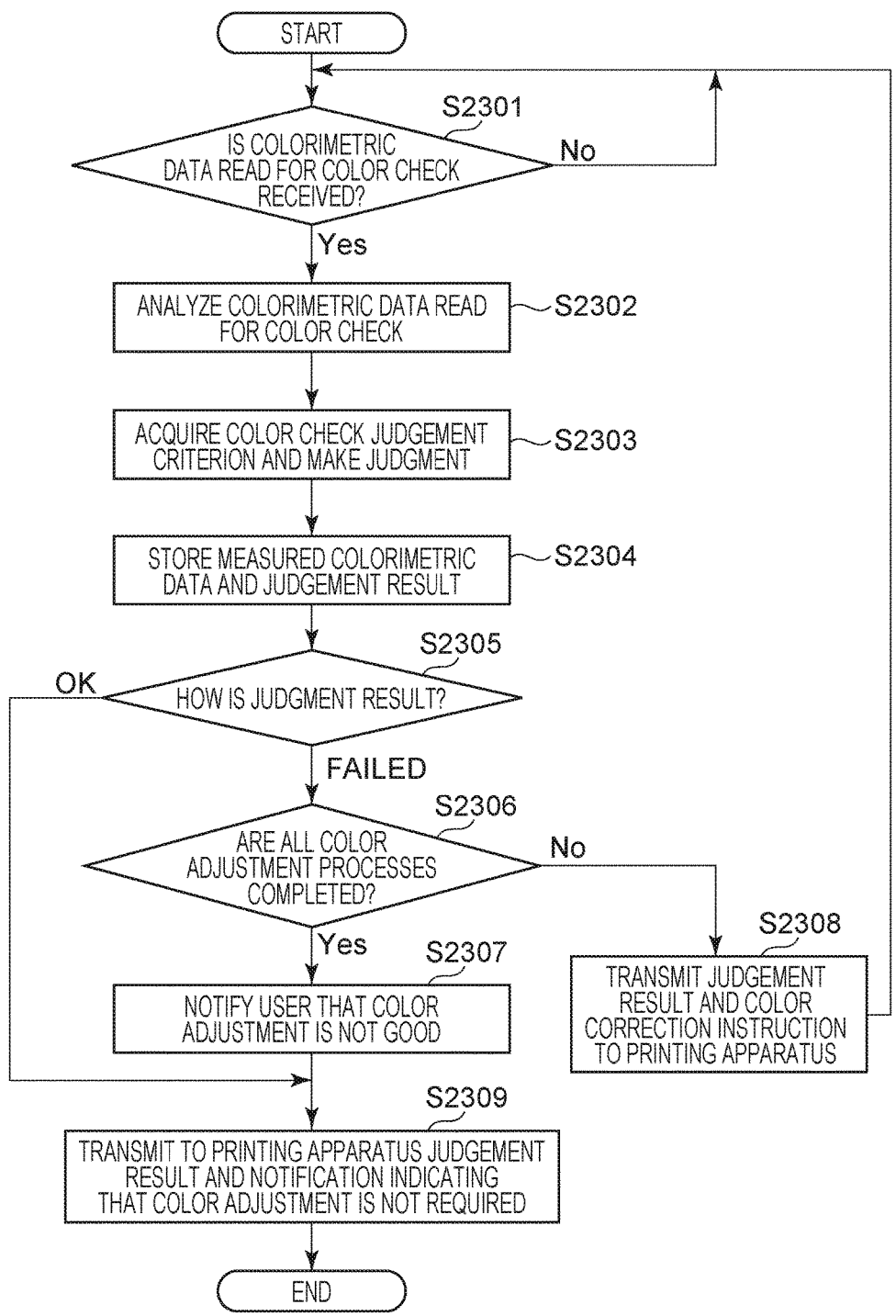
FIG. 23 is a flow chart illustrating a process according to a first embodiment.

FIG. 23 is a flow chart illustrating a process performed by the site management server 102 according to the present embodiment. The processing flow shown in this flow chart is controlled by respective control units in the site management server 102. More specifically, a program stored in the HDD 404 of the site management server 102 is loaded into the RAM 403 and executed by the CPU 401 thereby executing the process.

In S2301, the CPU 401 determines whether colorimetric data for color check has been received from the printing apparatus 221. In a case where the colorimetric data for color check has been received, the processing flow proceeds to S2302. Note that the colorimetric data for color check is data including a result of a color measurement of a chart image printed by the printing apparatus 221. In S2302, the CPU 401 analyzes the received colorimetric data for color check. The processing flow proceeds to S2303. The analysis includes, for example, calculating the difference ($\Delta E$) between L,a,b color measurement data and L,a,b target value data for each patch described in DB1000 or the like according to a formula predetermined for each judgment criterion.

In S2303, the CPU 401 acquires, from the data management unit B704, a threshold value for the judgment criterion defined for the printing apparatus 221 from which the colorimetric data for color check has been received, and the CPU 401 compares the value ($\Delta E$) calculated in S2302 with the acquired threshold value. The CPU 401 then determines whether the comparison result satisfies the judgment criterion. The processing flow then proceeds to S2304. Note that in the judgment in S2303, not only the judgment is made for all items of each judgment criterion, but a final judgment is made as to whether the printing apparatus is in a proper color state. In the judgment, if even only one judgment result fails to satisfy a corresponding judgment criterion, it is determined that the printing apparatus is in an improper (not good) color state.

In S2304, the CPU 401 stores, in the data management unit B 704, a color check result including raw data received in S2301, analysis result data obtained as a result of the analysis in S2302, and a judgment result obtained in S2303, in association with date/time and printing apparatus information. The processing flow then proceeds to S2305. Note that in a case where an acquisition request for color check result is received from the site management terminal 211, the color check result is transmitted to the site management terminal 211 via the site management terminal communication unit 702. In a case where the site management terminal 211 receives a request for displaying the color check result from a user, the site management terminal 211 acquires the color check result from the site management server 102 via the data transmission/reception unit B 721 and displays the color check result, for example, as shown in FIGS. 19 to 21. That is, the color check result is stored such that the color check result can be displayed in response to a display request from a user. However, the site management server 102 does not provide the color check result when no request is issued.

In S2305, in a case where the judgment result in S2303 indicates that the color check fails to pass the judgment criterion, the CPU 401 advances the processing flow to S2306. On the other hand, in a case where the judgment result in S2303 indicates that the color check has passed the judgment criterion, the CPU 401 advances the processing flow to S2309.

In S2306, the CPU 401 determines whether color adjustment processes have been performed completely for all to be performed as recovery processes when the color check fails to pass the judgment criterion. In a case where it is determined that there is an unexecuted color adjustment process to be performed as a recovery process, the processing flow proceeds to S2308. In a case where all color adjustment processes are completed, the processing flow proceeds to S2307.

Figure 25:
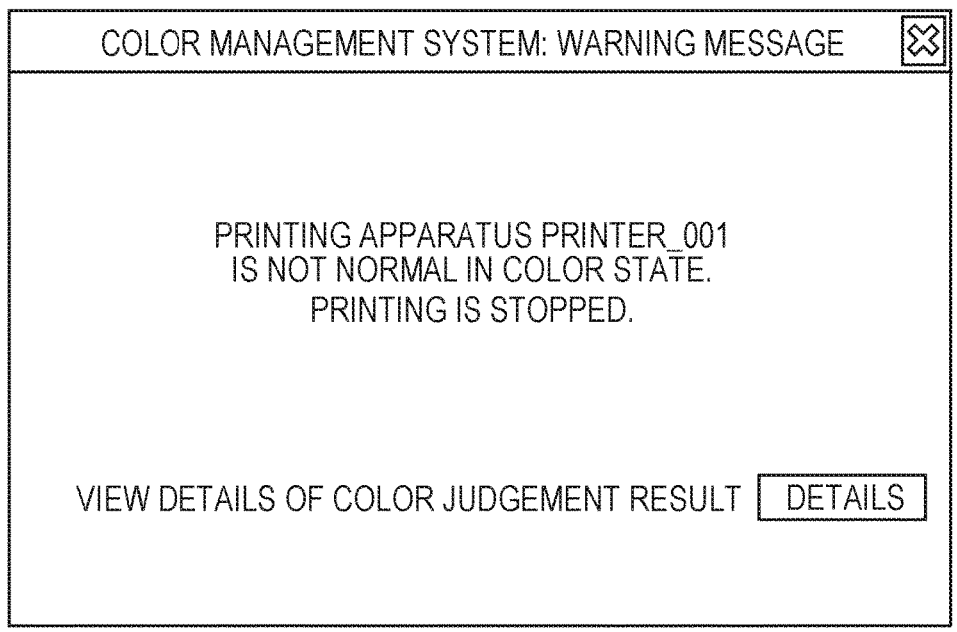
FIG. 25 is a diagram illustrating an example of a warning UI screen displayed in a site management application.

In S2307, the CPU 401 determines that the color state of the image printed by the printing apparatus remains improper even after all predetermined color adjustment processes have been performed, and the CPU 401 notifies a user that the image printed by the printing apparatus is in an improper color state, for example, by displaying a warning message such that shown in FIG. 25. The processing flow then proceeds to S2309. In the present embodiment, the warning information is given to a user by displaying the warning information on the site management terminal used by the user in checking the color state of the image printed by the printing apparatus. However, the manner of giving the warning information is not limited to this example. Alternatively, for example, a warning massage may be transmitted to the printing apparatus, which in turn may display the received warning message on a display unit of the printing apparatus or may make a lamp such as a tally lamp blink. In a case where a color expert carries a mobile terminal apparatus, the warning information may be given to the mobile terminal apparatus.

On the other hand, in a case where it is determined in S2306 that there is an unexecuted color adjustment process, then in S2308 the CPU 401 transmits information indicating the unexecuted color adjustment process together with the judgment result on the color check in S2303 to the printing apparatus via the printing apparatus communication unit 703. The processing flow then returns to S2301.

In S2309, the CPU 401 transmits information indicating that no more additional color adjustment is necessity together with information indicating the judgment result for the color check data performed in S2303 to the printing apparatus via the printing apparatus communication unit 703. The process is then ended.

Figure 24:
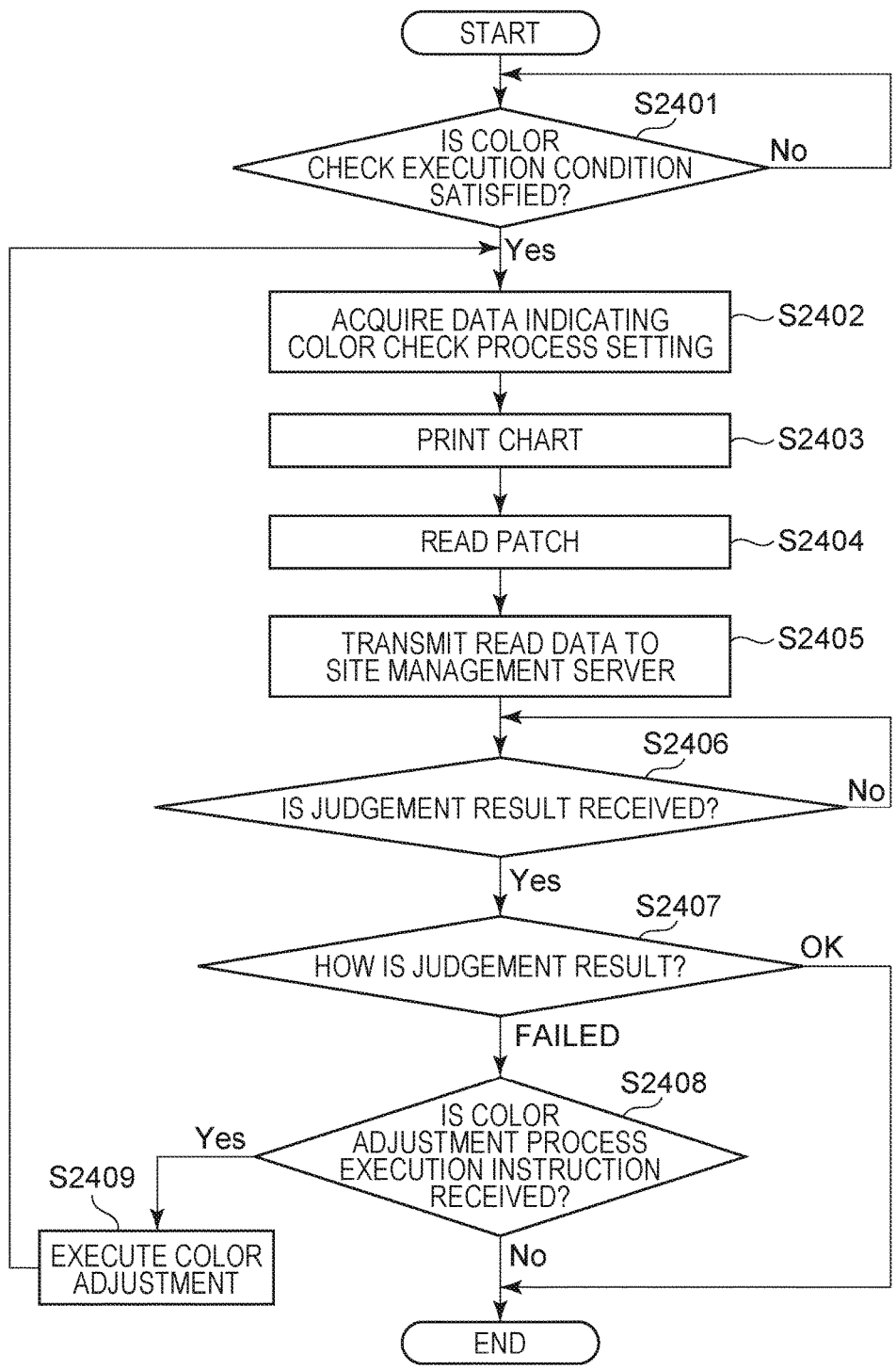
FIG. 24 is a flow chart illustrating a process according to a first embodiment.

Subsequently, a control processing flow performed by the printing apparatus 221 according to the present embodiment, in transmitting/receiving various kinds of data and command to/from the site management server 102, is described in detail below with reference to FIG. 24. The processing flow shown in this flow chart is executed such that a program stored in the HDD 504 of the printing apparatus 221 is loaded into the RAM 503 and executed by the CPU 501.

In S2401, the CPU 501 determines whether the color check execution condition such as that defined, for example, in DB300 is satisfied. In a case where it is determined that the color check execution condition is satisfied, the processing flow proceeds to S2402.

In S2402, the CPU 501 refers to DB203, DB206, and DB207 in DB200 and acquires, from the data management unit C, setting information necessary in executing the color check process. The processing flow then proceeds to S2403.

In S2403, the CPU 501 controls the print control unit 802 based on the setting information acquired in S2402 such that a chart image is printed on a proper sheet by the printing unit 509 according to patch data. The processing flow then proceeds to S2404.

In S2404, the CPU 501 controls the sensor control unit 803 such that the sheet on which the chart image was printed in S2403 is read by the color sensor 510 disposed in the printer 508. The measured data obtained as a result of reading the sheet by the color sensor 510 is stored in association with each patch on the chart image. The processing flow then proceeds to S2405.

In S2405, the CPU 501 transmits the measured data stored in S2404 to the site management server 102 via the data transmission/reception unit C. The processing flow then proceeds to S2406.

In S2406, the CPU 501 determines whether a result of a judgment on the measured data for the color check has been received from the site management server 102 via the data transmission/reception unit C. In a case where it is determined that the judgment result has been received, the processing flow proceeds to S2407.

In S2407, in a case where the judgment result received in S2406 indicates that a proper color state is obtained, the CPU 501 ends the process. On the other hand, in a case where the judgment result indicates that a proper color state is not obtained, the processing flow proceeds to S2408.

In S2408, the CPU 501 determines whether a color adjustment execution instruction has been received from the site management server 102 via the data transmission/reception unit C. In a case where it is determined that the color adjustment execution instruction has been received, the processing flow proceeds to S2409. On the other hand, in a case where it is determined that a notification indicating that the color adjustment is not necessary has been received, the process is ended.

In S2409, the CPU 501 performs control such that the color adjustment process is performed by the color management unit 805 in accordance with the color adjustment instruction received in S2408. After the color adjustment process is completed, the processing flow returns to S2402 in which the color check process is started to check whether a proper color state has been achieved.

In the present embodiment, the color check process is executed when the condition for executing the color check process by the printing apparatus 221 is satisfied. However, the situation in which the color check process is performed is not limited to this example. For example, when a request for executing a color check process issued by a user via the operation unit 512 of the printing apparatus is accepted, the control flow starting from S2402 may be executed. Still alternatively, for example, when a request for executing a color check process issued by a user via a site management terminal is accepted, the control flow may be executed. Still alternatively, for example, the site management server may determine whether the color check execution condition is satisfied, and the site management server may issue an instruction to execute the color check process.

Furthermore, in the present embodiment, by way of example but not limitation, the analysis of the measured color check data and the judgment of the color check state are executed by the site management server. Alternatively, for example, the judgment criterion may be stored in advance in the data management unit C 806 of the printing apparatus, and the determination as to whether the color state satisfies the judgment criterion or not may be performed by the printing apparatus when the color check process is executed by the printing apparatus.

In the above-described process according to the present embodiment, in a case where the result of the judgment of the color check indicates that the image printed by the printing apparatus is not in a proper color state, the site management server issues the instruction to execute the color adjustment process to improve the color state of the image printed by the printing apparatus. However, alternatively, for example, the color adjustment process and the execution order thereof may be stored in advance in the data management unit C 806 of the printing apparatus, and the color adjustment process may be automatically executed by the printing apparatus when the printing apparatus determines that the image printed by the printing apparatus is not in a proper color state. In this case, it may be desirable that the printing apparatus notifies the site management server that the color adjustment process has been executed.

The executing the process in the above-described manner makes it possible to automatically perform control depending on the result of the color check process executed in the printing apparatus such that the image printed by the printing apparatus has a proper color. This makes it possible to enhance the efficiency of a work performed by an operator by a color expert.

In this case, even when the result of the color check indicates that the color state of the image printed by the printing apparatus is not proper, it is not necessary to issue a warning to a color expert before the predetermined color adjustment process is executed. A warning may be issued only in a case where the color state is not improved even after the color adjustment process is executed when the judgment result indicates that the color state is not proper. By issuing the notifications in the above-described manner, it is possible to minimize notifications given to a color expert. This minimizes a disturbance to the color expert, which results in an enhancement in work efficiency of the color expert.

Second Embodiment

In the previous embodiment described above, when a result of a color check is not good, a color adjustment process is performed to improve the color state. However, if the color adjustment process does not result in achievement of a desired good result in a color check, a warning is given to a color expert or an operator to notify that a good color state is not achieved in images printed by the printing apparatus. In response, the color expert or the operator performs a recovery process that is not executed automatically, or performs cleaning, adjustment, exchanging of parts, or the like, with a help with a service person if necessary, such that a good color state is achieved in the image printed by the printing apparatus. In this situation, basically, it is not allowed to produce printed matters using this printing apparatus until the printing apparatus is readjusted such that the color check indicates that the desired good color state is obtained. Thus, a reduction in productivity at a print site may occur.

In view of the above, in a second embodiment, in a case where a desired good result is not obtained in a color check performed after the color adjustment process is executed, information on color states of other printing apparatuses managed by the site management server is checked to automatically search for a printing apparatus available for use instead of the printing apparatus that is not good in color state. When such an alternative printing apparatus is found, use of this printing apparatus is proposed. The processing flow for this purpose is described in detail below with reference to FIGS. 26 and 27.

FIG. 26 is a flow chart illustrating a process performed by the site management server according to the present embodiment. The processing flow shown in this flow chart is realized such that a program stored in the HDD 404 of the site management server is loaded into the RAM 403 and executed by the CPU 401.

In S2601, the CPU 401 determines whether the result of the color check performed after the color adjustment process is executed indicates that the printing apparatus has recovered from the improper state such that a desired good state is obtained in images printed by the printing apparatus. If it is determined that the good color state is achieved, the process is ended. However, in a case where it is determined that a desired good color state is not achieved, the processing flow proceeds to S2602.

In S2602, the CPU 401 determines whether there is a print job assigned to the printing apparatus which turns out to be in an improper color state (hereinafter such a printing apparatus will be referred to as a failed printing apparatus). In a case where it is determined that there is no print job assigned to that printing apparatus, the process is ended. However, in a case where it is determined that there is a print job assigned to the printing apparatus, the processing flow proceeds to S2603. In the present embodiment, depending on whether there is a print job to be executed, a determination is made as to whether searching for an alternative printing apparatus (hereinafter also referred to an alternative device). However, alternatively, searching for an alternative printing apparatus may be performed in advance even when there is no print job assigned to a failed device. This makes it possible for a color expert or an operator to select an alternative device in advance or define a priority for printing apparatuses in selection of an alternative device. That is, it is possible to immediately start a printing process using an alternative device even in a case where a print job is given immediately after f a color check process is executed.

In S2603, the CPU 401 acquires information indicating the setting of the print job assigned to the failed device. The processing flow then proceeds to S2604. The setting of the print job is, for example, setting of a finishing process, setting of sheet types to be used, and/or the like.

In S2604, the CPU 401 performs searching, based on the information acquired S2603 regarding the setting of the print job, for another printing apparatus capable of executing the print job from printing apparatuses managed by the site management server. The processing flow then proceeds to S2605. For example, in a case where the setting of the job assigned to the failed device includes a punching process, a printing apparatus capable of executing the same punching process is searched for. If a proper printing apparatus is found, the printing apparatus is saved as a candidate device for alternative use.

In S2605, the CPU 401 determines whether a candidate device for alternative use is found in S2604. In a case where it is determined that a candidate device for alternative use is found, the processing flow proceeds to S2606. On the other hand, in a case where it is determined that no candidate device for alternative use is found, the processing flow proceeds to S2615.

In S2606, the CPU 401 acquires information indicating the color check setting of the printing apparatus detected in S2604 as the candidate device for alternative use and acquires information indicating the color check setting of the failed device. The processing flow then proceeds to S2607. Note that the information about the color check setting is information indicating a patch chart, a reference, a judgment criterion stored, for example, in DB200.

In S2607, the CPU 401 performs a control flow described below to compare the color check setting of the candidate device for alternative use with the color check setting of the failed device. The processing flow then proceeds to S2608.

In S2608, the CPU 401 determines whether the color check judgment criterion for the candidate device for alternative use is stricter than or equal to the color check judgment criterion for the failed device. In a case where the color check judgment criterion for the candidate device for alternative use is stricter than or equal to that for the failed device (that is, in a case where the candidate device for alternative use is capable of providing higher color quality), the processing flow proceeds to S2609. However, in a case where the color check judgment criterion for the candidate device for alternative use is laxer than that for the failed device, the processing flow returns to S2606 to make a comparison in color check setting for a next candidate device for alternative use. In a case where it is determined that the color check judgment criterion for the candidate device for alternative use is laxer than that for the failed device, this printing apparatus is removed from the alternative candidates, a comparison in color check setting is made for a next candidate device for alternative use. However, alternatively, for example, when it is determined that the color check judgment criterion for a candidate device for alternative use is laxer than that for the failed device, a color check process may be performed on the candidate device for alternative use using the same condition defined in the color check setting for the failed device and a color check result may be obtained by judging whether the same color check judgment criterion as that for the failed device is satisfied. Furthermore, instead of perfuming the color check process using the same condition as that for the failed device after the comparison of the color check setting, for example, the color check process may be always performed on printing apparatuses managed by the site management server using the same condition as that for the failed device without making the comparison of the color check setting.

In S2609, the CPU 401 acquires a result of a latest color check performed on the candidate device for alternative use using the judgment criterion determined in S2608 as being stricter than or equal to the judgment criterion applied to the failed device. The processing flow then proceeds to S2610.

In S2610, the CPU 401 determines whether the latest color check result acquired in S2609 indicates that the same judgment criterion as that for the failed device is satisfied. In a case where it is determined that the judgment criterion is satisfied, the processing flow proceeds to S2611. On the other hand, in a case where it is determined that the same judgment criterion as that for the failed device is not satisfied, the processing flow returns to S2606 to make a comparison in color check setting for a next candidate device for alternative use. It may be desirable to acquire, in S2609, not only the judgment result of the color check with respect to the judgment criterion but also measured data obtained in the color check. Furthermore, in S2610, it may be desirable to analyze the measured data of the candidate device for alternative use with reference to the judgment criterion for the failed device, and judge the color check. This provides an advantage that even in a case where the judgment criterion for the candidate device for alternative use is stricter than the judgment criterion for the failed device, but the judgment result for the candidate device for alternative use does not satisfy the stricter judgment criterion, it is allowed to use the candidate device for alternative use if the candidate device for alternative use satisfies the judgment criterion for the failed device.

In S2611, the CPU 401 determines that the printing apparatus under the evaluation can be a candidate device for alternative use and the CPU 401 saves it in the RAM 403. The processing flow then proceeds to S2612.

In S2612, the CPU 401 determines whether the comparison in terms of the color check setting is completed for all candidate devices for alternative use saved in S2604. In a case where it is determined that the comparison is completed for all candidate devices for alternative use, the processing flow proceeds to S2613. On the other hand, in a case where there is a candidate device for alternative use that is not yet subjected to the comparison, the processing flow returns to S2606 to make a comparison in color check setting for a next candidate device for alternative use.

In S2613, the CPU 401 determines whether there is a printing apparatus saved in S2611 as a candidate device for alternative use. In a case where it is determined that there is a candidate device for alternative use, the processing flow proceeds to S2614. In a case where it is determined that there is no candidate device for alternative use, the processing flow proceeds to S2615.

Figure 28A:
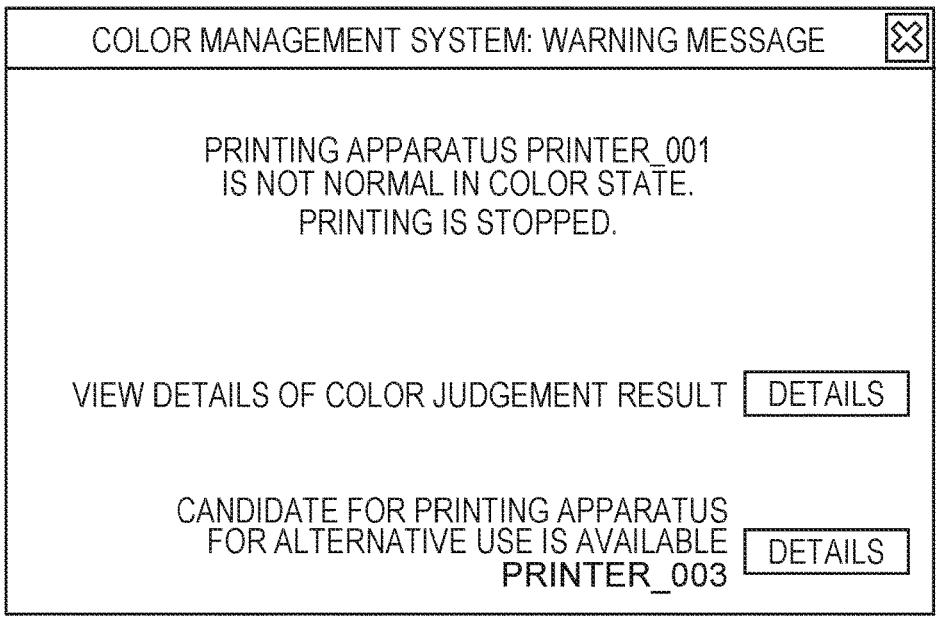
FIG. 28A and FIG. 28B are diagrams illustrating an example of a warning UI screen displayed in a site management application.

In S2614, the CPU 401 notifies a user that a candidate device for alternative use is available as illustrated by way of example in FIG. 28A. The process is then ended. In the example shown in FIG. 28A, a warning message indicating that the result of the color check judgment after the color adjustment process is not good and a notification that a candidate device for alternative use is available are displayed together on the same screen. However, alternatively, for example, a user may be allowed to issue a request via a site management terminal for displaying a candidate device for alternative use. When the display request is received, the candidate device for alternative use may be displayed. Instead of the site management terminal, the operation unit of the failed device may be used to accept a request for displaying a candidate device for alternative use. In a case where a plurality of candidate devices for alternative use exist, it may be desirable to display a list of candidate devices for alternative use. In this case, priority levels of a plurality of candidate devices for alternative use may be defined, and candidate devices for alternative use with higher priority levels may be displayed at the top of the list. For example, candidate devices for alternative use may be displayed in descending order of precision of data acquired in S2609 with reference to the failed device (in the ascending order of the difference from the reference). Print jobs assigned to the respective candidate devices for alternative use may be checked, and the candidate devices for alternative use may be displayed in ascending order of the number of sheets to be printed.

Figure 28B:
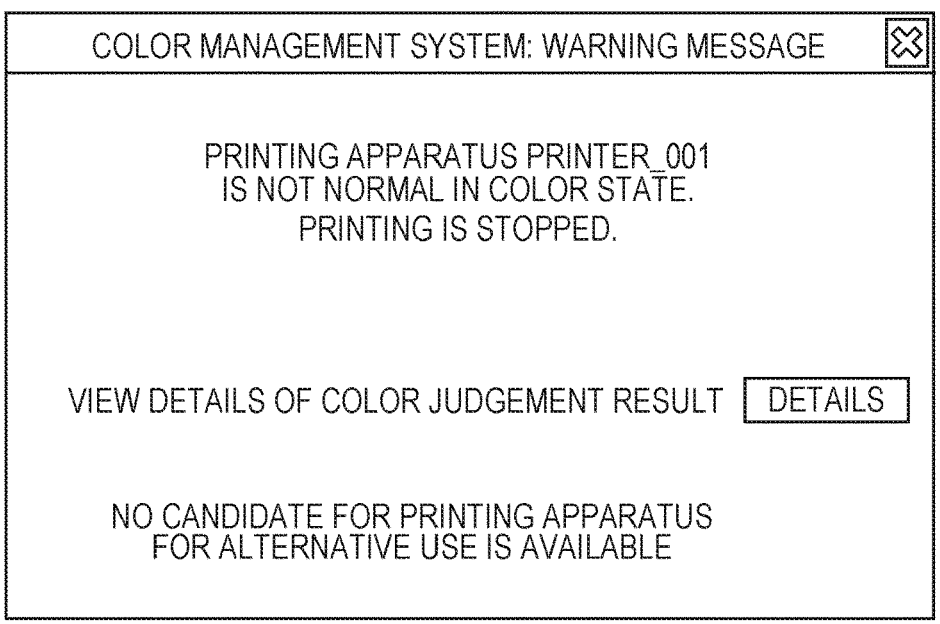

In S2615, the CPU 401 notifies a user that no candidate device for alternative use is available, for example, as shown in FIG. 28B. The process is then ended. In the example described above, a notification in S2614 and also in S2615 is given to a user by displaying a message on a site management terminal used by the user in checking the color state. However, alternatively, for example, a message may be transmitted to the failed device to display, on a display unit of the failed device, information associated with candidate devices for alternative use. In a case where a color expert or an operator carries a mobile terminal apparatus, the information may be given to the mobile terminal apparatus.

The process of making a comparison in terms of the color check setting between the failed device and candidate devices for alternative use in S2607 is described in further detail below with reference to a flow chart shown in FIG. 27. The color check settings subjected to the comparison here are read out from a database stored in a data structure shown by way of example in FIG. 9. To refer to a color check setting of each device, the color check profile DB1103 of the printing apparatuses DB1100 under the management is accessed to search for all color check profiles, and a color check setting are read from the color check setting DB104 of each color check profile. The processing flow shown in this flow chart is realized such that a program stored in the HDD 404 of the site management server is loaded into the RAM 403 and executed by the CPU 401.

In S2701, the CPU 401 compares the color check setting ID DB201 between the failed device and a candidate device for alternative use. If their color check setting IDs are identical, the processing flow proceeds to S2709. However, if their color check setting IDs are different, the processing flow proceeds to S2702.

In S2702, the CPU 401 compares the patch chart ID of the failed device with the patch chart ID of the candidate device for alternative use. If the patch chart IDs are identical, the processing flow proceeds to S2703. However, if the patch chart IDs are different, the processing flow proceeds to S2708.

In S2703, the CPU 401 compares sheet types used in printing a chart between the failed device and the candidate device for alternative use. If the sheet types are identical, the processing flow proceeds to S2704. However, if the sheet types are different, the processing flow proceeds to S2708.

In S2704, the CPU 401 compares the reference ID of the failed device with the reference ID of the candidate device for alternative use. If the reference IDs are identical, the processing flow proceeds to S2705. However, if the reference IDs are different the processing flow proceeds to S2708.

In S2705, the CPU 401 compares the judgment criterion ID of the candidate device for alternative use with the judgment criterion ID of the failed device. In a case where the judgment criterion IDs are identical, the processing flow proceeds to S2709. However, in a case where the judgment criterion IDs are different, the processing flow proceeds to S2706. Note that when the judgment criterion ID of the candidate device for alternative use is different from the judgment criterion ID of the failed device, if the judgment criterion for the candidate device for alternative use satisfies the judgment criterion for the failed device, the candidate device for alternative use may be acceptable. For this reason, in the present embodiment, processing steps S2706 and S2707 are further performed in a case where the judgment criterion ID of the candidate device for alternative use is different from the judgment criterion ID of the failed device. However, alternatively, the process may include only the comparison of the judgment criterion ID.

In S2706, the CPU 401 compares the judgment criterion DB700 for the candidate device for alternative use with the judgment criterion DB700 for the failed device to determine whether DB703 to DB709 included in the judgment criterion items DB700 for the failed device are all included in the judgment criterion items for the candidate device for alternative use. In a case where it is determined that DB703 to DB709 included in the judgment criterion items DB700 for the failed device are all included in the judgment criterion items for the candidate device for alternative use, the processing flow proceeds to S2707. However, in a case where it is determined that even only one of DB703 to DB709 included in the judgment criterion items DB700 for the failed device is not included in the judgment criterion items for the candidate device for alternative use, the processing flow proceeds to S2708.

In S2707, if the CPU 401 determines that the result of the comparison of the value of each judgment criterion item between the candidate device for alternative use and the failed device indicates that values in all judgment criterion items are stricter or equal for the candidate device for alternative use than for the failed device, then the processing flow proceeds to S2709. However, if it is determined that a value is stricter in any one of the judgment criterion items for the failed device, the processing flow proceeds to S2708. Note that being stricter in judgment criterion means that a smaller difference is required between a measured value and a reference. For example, in the case of the average color difference, when a small value is specified by the judgment criterion as an allowable average color difference, the judgment criterion is said to be strict.

In S2708, the CPU 401 determines that the color check setting is different between the failed device and the candidate device for alternative use or the judgment criterion for the candidate device for alternative use is laxer than for the failed device. The processing flow then proceeds to S2608.

In S2709, the CPU 401 determines that the color check setting is identical for both the failed device and the candidate device for alternative use, and the judgment criterion for the candidate device for alternative use satisfies the judgment criterion for the failed device. The processing flow then proceeds to S2608.

In the above-described process according to the present embodiment, when a printing apparatus fails to achieve a proper color state for a printed image even after a color adjustment process is executed, a printing apparatus capable of providing a proper color state is automatically selected from other printing apparatuses located at the same site and use of the selected printing apparatus is proposed to a user. This makes it possible to determine an optimum alternative printing apparatus without depending on the skill of a color expert. Furthermore, immediately presenting a printing apparatus for alternative use makes it possible to minimize the reduction in productivity at the print site.

According to embodiments of the present disclosure, in a case where a printing apparatus under the color management fails to pass a judgment criterion in a color check on an image printed by the printing apparatus, a predetermined recovery process is executed. However, if the printing apparatus still does not satisfy the judgment criterion, then an error notification is given to a user. This minimizes notifications given to users, and thus an improvement in productivity of users is achieved.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-189093 filed Sep. 28, 2017, which is hereby incorporated by reference herein in its entirety.

What is claimed is:

1. An information processing apparatus capable of being connected to an image processing apparatus comprising an image forming unit, the information processing apparatus comprising:
    one or more processors; and
    at least one memory storing executable instructions, which when executed by the one or more processors, cause the information processing apparatus to:
        acquire a judgment result indicating whether a colorimetric value obtained as a result of measuring a color of a chart image formed by the image forming unit satisfies a predetermined criterion in terms of a difference between the colorimetric value and a target value;
        transmit, in a case that the acquired judgment result does not satisfy the criterion, an instruction for executing a color adjustment process to the image processing apparatus without transmitting the judgment result to the image processing apparatus;
        execute a judgment process, after the image processing apparatus executes the color adjustment process, for judging whether a colorimetric value obtained as a result of measuring the color of a chart image formed by the image forming unit satisfies a predetermined criterion in terms of a difference between the colorimetric value and a target value and acquire a judgment result of the judgment process; and
        transmit, in a case that the judgment result of the judgment process does not satisfy the criterion, the judgment result to the image processing apparatus such that a display of the image processing apparatus displays the judgment result.

2. The information processing apparatus according to claim 1, wherein the instructions, when executed by the one or more processors, further cause the information processing apparatus to:
    detect whether a color adjustment process has been executed in the image processing apparatus,
    wherein in a case where the detection detects that the color adjustment process has been executed, the information processing apparatus does not issue the instruction for executing the color adjustment process.

3. The information processing apparatus according to claim 1, wherein the instructions, when executed by the one or more processors, further cause the information processing apparatus to:
    in a case where a difference between the color measurement result of the chart image formed by the image forming unit and the target value is smaller than or equal to a threshold value, judge that the color measurement result of the chart image formed by the image forming unit satisfies the criterion.

4. The information processing apparatus according to claim 1, wherein
    in the color adjustment process, a correction parameter used in forming an image by the image forming unit is generated for causing the difference between the color measurement result and the target value to become smaller than a threshold value.

5. The information processing apparatus according to claim 1, wherein
    the result of the color measurement on the chart formed by the image forming unit is a result of a color measurement performed by a sensor located between a fixing unit and a paper output slit in a sheet conveying path of the image processing apparatus.

6. The information processing apparatus according to claim 1, wherein
    in the case that the judgment result of the judgment process does not satisfy the criterion, a print job, which has been instructed to be executed by the image processing apparatus, is transmitted to another image processing apparatus connected to the information processing apparatus.

7. The information processing apparatus according to claim 6, wherein
    the other image processing apparatus is an image processing apparatus capable of executing a job setting assigned to the print job, and a colorimetric value obtained by the other image processing apparatus satisfies the judgment criterion.

8. A method of controlling an information processing apparatus capable of being connected to an image processing apparatus comprising an image forming unit, the method comprising:
    acquiring a judgment result indicating whether a colorimetric value obtained as a result of measuring a color of a chart image formed by the image forming unit satisfies a predetermined criterion in terms of a difference between the colorimetric value and a target value;
    transmitting, in a case that the acquired judgment result does not satisfy the criterion, an instruction for executing a color adjustment process to the image processing apparatus without transmitting the judgment result to the image processing apparatus;
    executing a judgment process, after the image processing apparatus to executes the color adjustment process, for judging whether a colorimetric value obtained as a result of measuring the color of a chart image formed by the image forming unit satisfies a predetermined criterion in terms of a difference between the colorimetric value and a target value and acquiring a judgment result of the judgment process; and
    transmitting, in a case that the judgment result of the judgment process does not satisfy the criterion, the judgment result to the image processing apparatus such that a display of the image processing apparatus displays the judgment result.

9. An image processing apparatus including an image forming unit, the image processing apparatus comprising:
    one or more processors; and at least one memory storing executable instructions, which when executed by the one or more processors, cause the image processing apparatus to:
execute a judgment process to judge whether a colorimetric value obtained as a result of measuring a color of a chart image formed by the image forming unit satisfies a predetermined criterion in terms of a difference between the colorimetric value and a target value;
execute, in a case where it is judged that the obtained colorimetric value does not satisfy the predetermined criterion, a color adjustment process without causing a result of the judgment process to be displayed on a display; and
display, in a case where the judgment process is executed after a color adjustment process is executed and it is judged that the obtained colorimetric value does not satisfy the predetermined criterion, the result of the judgment process on the display.

10. A method for controlling an image processing apparatus including an image forming unit, the method comprising:
executing a judgment process to judge whether a colorimetric value obtained as a result of measuring a color of a chart image formed by the image forming unit satisfies a predetermined criterion in terms of a difference between the colorimetric value and a target value;
executing, in a case where it is judged that the obtained colorimetric value does not satisfy the predetermined criterion, a color adjustment process without causing a result of the judgment process to be displayed on a display; and
displaying, in a case where the judgment process is executed after a color adjustment process is executed and it is judged that the obtained colorimetric value does not satisfy the predetermined criterion, the result of the judgment process on the display.

* * * * *